(12) United States Patent
Maehira et al.

(10) Patent No.: US 8,789,906 B2
(45) Date of Patent: Jul. 29, 2014

(54) CONTROLLING DEVICE FOR CAUSING PRINT PERFORMING UNIT TO PERFORM PRINT

(75) Inventors: Hirotoshi Maehira, Nagoya (JP); Masashi Kuno, Obu (JP); Sadaaki Miyazaki, Nagoya (JP); Toru Mizuno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 181 days.

(21) Appl. No.: 13/429,407

(22) Filed: Mar. 25, 2012

(65) Prior Publication Data

US 2013/0083101 A1    Apr. 4, 2013

(30) Foreign Application Priority Data

Sep. 30, 2011    (JP) .................................. 2011-217249

(51) Int. Cl.
*B41J 29/38*    (2006.01)
(52) U.S. Cl.
USPC ............................................................ 347/9
(58) Field of Classification Search
USPC ....................................................... 347/9–19
IPC ........................................................ B41J 29/38
See application file for complete search history.

(56) References Cited

U.S. PATENT DOCUMENTS

| 2002/0057309 | A1* | 5/2002 | Ikemoto et al. | 347/42 |
| 2005/0134617 | A1* | 6/2005 | Yamaguchi et al. | 347/5 |
| 2006/0274099 | A1* | 12/2006 | Jahana et al. | 347/15 |
| 2009/0231601 | A1* | 9/2009 | Tanaka | 358/1.8 |
| 2009/0256873 | A1* | 10/2009 | Yamaguchi et al. | 347/8 |

FOREIGN PATENT DOCUMENTS

| JP | 2002-103720 A | 4/2002 |
| JP | 2004-050705 A | 2/2004 |
| JP | 2006-159702 A | 6/2006 |
| JP | 2009-262346 A | 11/2009 |
| JP | 2010-100017 A | 5/2010 |

* cited by examiner

*Primary Examiner* — Manish S Shah
*Assistant Examiner* — Roger W Pisha, II
(74) *Attorney, Agent, or Firm* — Baker Botts L.L.P.

(57) ABSTRACT

In a case where N1 lines (N1 being less than N which is a number of nozzles included in one nozzle line) of target line image data represent N1 lines of target line images to be printed by only one specific color of ink, and (N–N1) lines of remaining line image data include line image data which represents a line image to be printed by two or more colors of ink, the controlling device may select only the N1 lines of target line image data, so as to determine the opposite direction of the direction of the main scanning of a previous time as the direction of the main scanning of a present time.

12 Claims, 12 Drawing Sheets

FIG. 2
(A1) Comparative Example
(A2) First Embodiment
(Direction of Color Path=OP(Fixed))
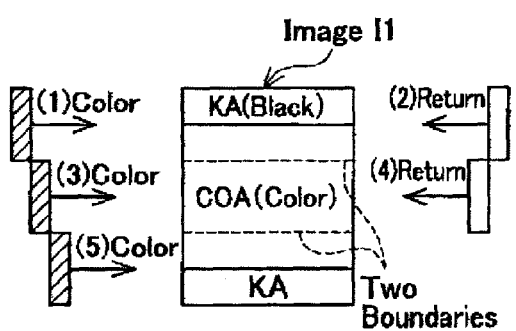
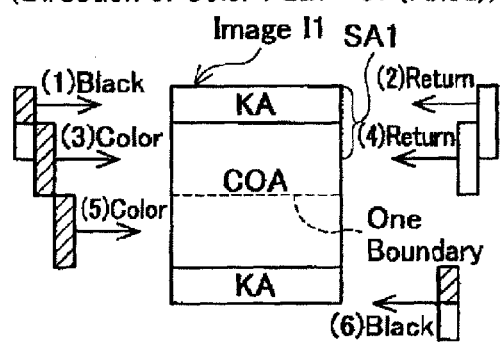
(B1) Comparative Example
(B2) Second Embodiment
(Direction of Color Path=
Same Direction as Previous Time)
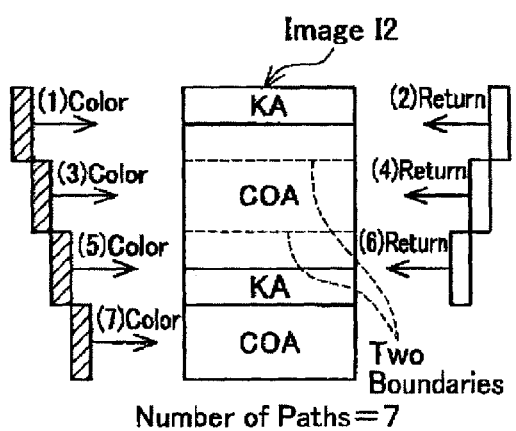
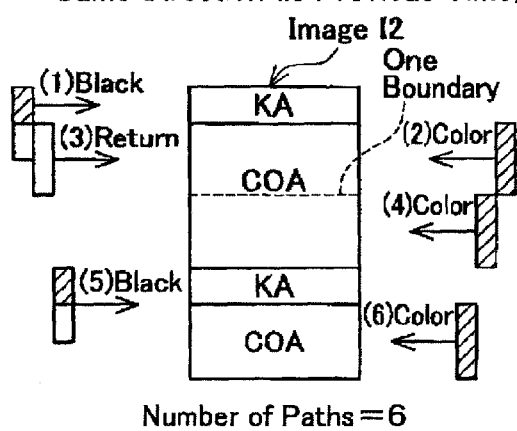
Number of Paths = 7
Number of Paths = 6

FIG. 3
(C1) Comparative Example
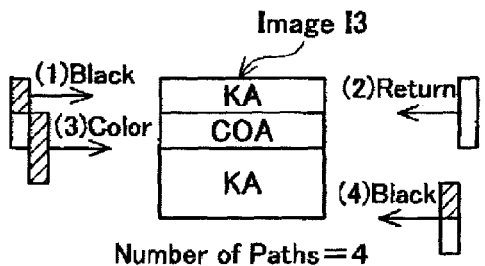
Number of Paths = 4
(C2) First and Second Embodiments
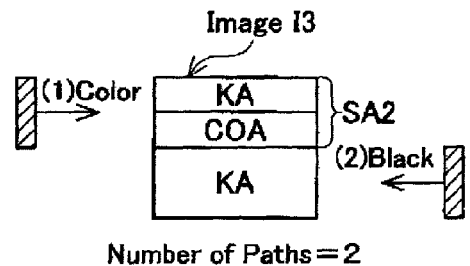
Number of Paths = 2
(D1) Comparative Example
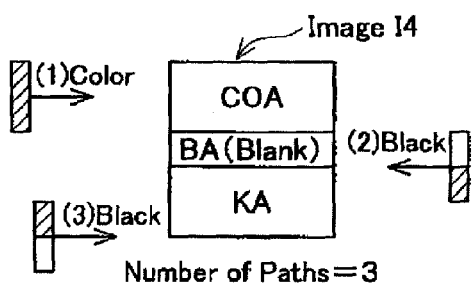
Number of Paths = 3
(D2) First and Second Embodiments
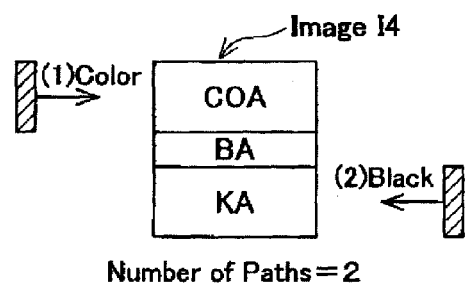
Number of Paths = 2
(E1) Comparative Example
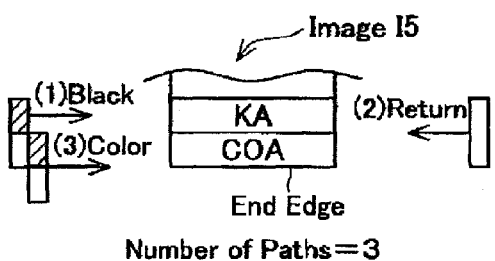
Number of Paths = 3
(E2) First and Second Embodiments
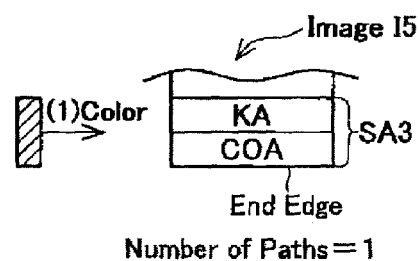
Number of Paths = 1

FIG. 8

(Case A)

| | ID | NK1 | NC1 | NB1 | NK2 | NC2 | NB2 | |
|---|---|---|---|---|---|---|---|---|
| L | K | ① | 0 | 0 | 0 | 0 | 0 | |
| L+1 | K | ② | 0 | 0 | 0 | 0 | 0 | |
| L+2 | K | ③ | 0 | 0 | 0 | 0 | 0 | |
| L+3 | K | ④ | 0 | 0 | 0 | 0 | 0 | → YES in S22 (Fig.4), |
| L+4 | K | ① | 0 | 0 | 0 | 0 | 0 | YES in S26 |

Partial Image Data (S34 of Fig.4)

Main Scanning Direction = OP or RP
(S144 of Fig.7)

Transporting Distance = 4 Nozzle Pitch
(S148 of Fig.7)

(Case B)

| | ID | NK1 | NC1 | NB1 | NK2 | NC2 | NB2 | |
|---|---|---|---|---|---|---|---|---|
| L | K | ① | 0 | 0 | 0 | 0 | 0 | |
| L+1 | K | ② | 0 | 0 | 0 | 0 | 0 | |
| L+2 | B | ③ | 0 | 0 | 0 | 0 | 0 | |
| L+3 | K | ④ | 0 | 0 | 0 | 0 | 0 | → YES in S22 (Fig.4), |
| L+4 | K | ① | 0 | 0 | 0 | 0 | 0 | YES in S26 |

Partial Image Data (S34 of Fig.4)

Main Scanning Direction = OP or RP
(S144 of Fig.7)

Transporting Distance = 4 Nozzle Pitch
(S148 of Fig.7)

(Case C)

| | ID | NK1 | NC1 | NB1 | NK2 | NC2 | NB2 | |
|---|---|---|---|---|---|---|---|---|
| L | B | 0 | 0 | ① | 0 | 0 | 0 | |
| L+1 | B | 0 | 0 | ② | 0 | 0 | 0 | |
| L+2 | K | ① | 0 | 2 | 0 | 0 | 0 | |
| L+3 | K | ② | 0 | 2 | 0 | 0 | 0 | |
| L+4 | K | ③ | 0 | 2 | 0 | 0 | 0 | |
| L+5 | K | ④ | 0 | 2 | 0 | 0 | 0 | → YES in S22 (Fig.4), YES in S26 |

Partial Image Data (S34 of Fig.4)

Main Scanning Direction = OP or RP
(S144 of Fig.7)

Transporting Distance = 6 Nozzle Pitch
(S148 of Fig.7)

FIG. 9

(Case D)

Partial Image Data (S34 of Fig.4)

| | ID | NK1 | NC1 | NB1 | NK2 | NC2 | NB2 | |
|---|---|---|---|---|---|---|---|---|
| L | CO | 0 | ① | 0 | 0 | 0 | 0 | |
| L+1 | CO | 0 | ② | 0 | 0 | 0 | 0 | |
| L+2 | CO | 0 | ③ | 0 | 0 | 0 | 0 | YES in S22 (Fig.4), |
| L+3 | CO | 0 | ④ | 0 | 0 | 0 | 0 | → NO in S26, |
| L+4 | CO | 0 | ① | 0 | 0 | 0 | 0 | YES in S28 |

Main Scanning Direction = OP
(S142 of Fig.7)

Transporting Distance = 4 Nozzle Pitch (Case E)

Partial Image Data (S34 of Fig.4)

| | ID | NK1 | NC1 | NB1 | NK2 | NC2 | NB2 | |
|---|---|---|---|---|---|---|---|---|
| L | CO | 0 | ① | 0 | 0 | 0 | 0 | |
| L+1 | CO | 0 | ② | 0 | 0 | 0 | 0 | |
| L+2 | B | 0 | ③ | 0 | 0 | 0 | 0 | YES in S22 (Fig.4), |
| L+3 | CO | 0 | ④ | 0 | 0 | 0 | 0 | → NO in S26, |
| L+4 | CO | 0 | ① | 0 | 0 | 0 | 0 | YES in S28 |

Main Scanning Direction = OP
(S142 of Fig.7)

Transporting Distance = 4 Nozzle Pitch (Case F)

Partial Image Data (S34 of Fig.4)

| | ID | NK1 | NC1 | NB1 | NK2 | NC2 | NB2 | |
|---|---|---|---|---|---|---|---|---|
| L | CO | 0 | ① | 0 | 0 | 0 | 0 | |
| L+1 | CO | 0 | ② | 0 | 0 | 0 | 0 | |
| L+2 | K | 0 | ③ | 0 | 0 | 0 | 0 | YES in S22 (Fig.4), |
| L+3 | CO | 0 | ④ | 0 | 0 | 0 | 0 | → NO in S26, |
| L+4 | CO | 0 | ① | 0 | 0 | 0 | 0 | YES in S28 |

Main Scanning Direction = OP
(S142 of Fig.7)

Transporting Distance = 4 Nozzle Pitch

FIG. 10

(Case G)

Partial Image Data (S58 of Fig.5):

| ID | NK1 | NC1 | NB1 | NK2 | NC2 | NB2 | |
|---|---|---|---|---|---|---|---|
| L   | K  | ① | 0 | 0 | 0 | 0 | 0 |
| L+1 | K  | ② | 0 | 0 | 0 | 0 | 0 |
| L+2 | K  | ③ | 0 | 0 | 0 | 0 | 0 | YES in S22 (Fig.4), |

Partial Image Data (S62 of Fig.5):

| L+3 | CO | 3 | ① | 0 | 0 | 0 | 0 | → NO in S26, |
| L+4 | CO | 3 | 1 | 0 | 0 | ① | 0 | NO in S28 |
| L+5 | CO | 3 | 1 | 0 | 0 | ② | 0 | |
| L+6 | CO | 3 | 1 | 0 | 0 | ③ | 0 | → YES in S54 (Fig.5), YES in S56 |

→ Main Scanning Direction = OP or RP (S144 of Fig.7)
   Transporting Distance = 3 Nozzle Pitch (S148 of Fig.7)

→ Main Scanning Direction = OP (S142 of Fig.7)
   Transporting Distance = 4 Nozzle Pitch (S148 of Fig.7)

(Case H)

Partial Image Data (S58 of Fig.5):

| ID | NK1 | NC1 | NB1 | NK2 | NC2 | NB2 | |
|---|---|---|---|---|---|---|---|
| L   | K | ① | 0 | 0 | 0 | 0 | 0 |
| L+1 | B | ② | 0 | 0 | 0 | 0 | 0 |
| L+2 | K | ③ | 0 | 0 | 0 | 0 | 0 | YES in S22 (Fig.4), |

Partial Image Data (S62 of Fig.5):

| L+3 | CO    | 3 | ① | 0 | 0 | 0 | 0 | → NO in S26, |
| L+4 | CO    | 3 | 1 | 0 | 0 | ① | 0 | NO in S28 |
| L+5 | KorB  | 3 | 1 | 0 | 0 | ② | 0 | |
| L+6 | CO    | 3 | 1 | 0 | 0 | ③ | 0 | → YES in S54 (Fig.5), YES in S56 |

→ Main Scanning Direction = OP or RP (S144 of Fig.7)
   Transporting Distance = 3 Nozzle Pitch (S148 of Fig.7)

→ Main Scanning Direction = OP (S142 of Fig.7)
   Transporting Distance = 4 Nozzle Pitch (S148 of Fig.7)

(Case I)

Partial Image Data (S72 of Fig.5):

| ID | NK1 | NC1 | NB1 | NK2 | NC2 | NB2 | |
|---|---|---|---|---|---|---|---|
| L   | K  | ① | 0 | 0 | 0 | 0 | 0 |
| L+1 | K  | ② | 0 | 0 | 0 | 0 | 0 |
| L+2 | K  | ③ | 0 | 0 | 0 | 0 | 0 | YES in S22 (Fig.4), |
| L+3 | CO | 3 | ① | 0 | 0 | 0 | 0 | → NO in S26, |
| L+4 | K  | 3 | 1 | 0 | ① | 0 | 0 | NO in S28 |
| L+5 | K  | 3 | 1 | 0 | ② | 0 | 0 | |
| L+6 | K  | 3 | 1 | 0 | ③ | 0 | 0 | → YES in S54 (Fig.5), NO in S56 |

Main Scanning Direction = OP (S142 of Fig.7)

Transporting Distance = 4 Nozzle Pitch (S148 of Fig.7)

| L+4 | K | | | | | | |
| L+5 | K | | | | | | |
| L+6 | K | 3 | 0 | 0 | 0 | 0 | 0 | → S76 (Fig.5) |

FIG. 11

(Case J)

| | | NK1 | NC1 | NB1 | NK2 | NC2 | NB2 | |
|---|---|---|---|---|---|---|---|---|
| Partial Image Data (S30 of Fig.4) | LT-3 K | ① | 0 | 0 | 0 | 0 | 0 | |
| | LT-2 K | ② | 0 | 0 | 0 | 0 | 0 | |
| | LT-1 K | ③ | 0 | 0 | 0 | 0 | 0 | |
| | LT CO | 3 | ① | 0 | 0 | 0 | 0 | ← YES in S20 (Fig.4) |

↓

Main Scanning Direction = OP (S142 of Fig.7)
Transporting Distance = 4 Nozzle Pitch (S148 of Fig.7)

(Case K)

| | | NK1 | NC1 | NB1 | NK2 | NC2 | NB2 | |
|---|---|---|---|---|---|---|---|---|
| Partial Image Data (S88 of Fig.5) | LT-5 K | ① | 0 | 0 | 0 | 0 | 0 | |
| | LT-4 K | ② | 0 | 0 | 0 | 0 | 0 | |
| | LT-3 K | ③ | 0 | 0 | 0 | 0 | 0 | |
| Partial Image Data (S92 of Fig.5) | LT-2 CO | 3 | ① | 0 | 0 | 0 | 0 | ← YES in S22 (Fig.4), |
| | LT-1 K | 3 | 1 | 0 | ① | 0 | 0 | NO in S26, NO in S28 |
| | LT K | 3 | 1 | 0 | ② | 0 | 0 | ← YES in S84 (Fig.5), NO in S86 |

→ Main Scanning Direction = OP or RP (S144 of Fig.7)
Transporting Distance = 3 Nozzle Pitch (S148 of Fig.7)

→ Main Scanning Direction = OP (S142 of Fig.7)
Transporting Distance = 3 Nozzle Pitch (S148 of Fig.7)

(Case L)

| | | NK1 | NC1 | NB1 | NK2 | NC2 | NB2 | |
|---|---|---|---|---|---|---|---|---|
| Partial Image Data (S92 of Fig.5) | LT-5 K | ① | 0 | 0 | 0 | 0 | 0 | |
| | LT-4 K | ② | 0 | 0 | 0 | 0 | 0 | |
| | LT-3 K | ③ | 0 | 0 | 0 | 0 | 0 | |
| | LT-2 CO | 3 | ① | 0 | 0 | 0 | 0 | ← YES in S22 (Fig.4), |
| | LT-1 B | 3 | 1 | 0 | 0 | 0 | ① | NO in S26, NO in S28 |
| | LT B | 3 | 1 | 0 | 0 | 0 | ② | ← YES in S84 (Fig.5), YES in S86 |

↓

Main Scanning Direction = OP (S142 of Fig.7)
Transporting Distance = 4 Nozzle Pitch (S148 of Fig.7)

CONTROLLING DEVICE FOR CAUSING PRINT PERFORMING UNIT TO PERFORM PRINT

CROSS-REFERENCE TO RELATED APPLICATIONS

This application claims priority to Japanese Patent Application No. 2011-217249, filed on Sep. 30, 2011, the contents of which are hereby incorporated by reference into the present application.

TECHNICAL FIELD

In the present specification, a controlling device for causing a print performing unit to perform printing is disclosed. The print performing unit may comprise a print head including a plurality of nozzle lines for discharging a plurality of colors of ink.

DESCRIPTION OF RELATED ART

For example, an ink jet recording device that records an image on a print medium is known. The ink jet recording device performs main scanning in which the print head is caused to move in one direction or another direction while causing ink to be discharged from the print head toward the print medium. In this technique, main scanning in which the print head is caused to move in the one direction is performed to print an overlapping dot recording area using two or more colors of ink, and main scanning in which the print head is caused to move in the one direction or the other direction is performed to print another recording area (e.g., a black color recording area).

SUMMARY

In the present specification, a technique may be disclosed for reducing a number of times of main scanning performed while causing two or more colors of ink to be discharged from a print head.

One technique disclosed in the present application is a controlling device configured to cause a print performing unit to perform a print. The print performing unit may comprise a print head including a plurality of nozzle lines for discharging a plurality of colors of ink. Each of the plurality of nozzle lines may include N nozzles (N being an integer equal to or more than 2) for discharging corresponding color of ink. The print performing unit may be configured to perform a main scanning. The main scanning may include causing the print head to move in a first direction or a second direction during causing the plurality of nozzle lines to discharge ink toward a print medium. The controlling device may comprise one or more processors configured to function as: a print data creation unit configured to create, by using image data, print data for causing the print performing unit to perform a print of an image represented by the image data, the image data including a plurality of lines of line image data being continuously aligned along a predetermined direction; and a supplying unit configured to supply the print data to the pint performing unit. The print data creation unit may comprise a determination unit configured to sequentially select each of a plurality of partial image data from among the image data in an order from a first side toward a second side of the predetermined direction, so as to determine a direction of the main scanning for printing each partial image represented by the each partial image data. The each partial image data may include N or less lines of line image data being continuously aligned along the predetermined direction. The print data creation unit may be configured to create the print data such that the print performing unit performs the main scanning in accordance with the direction determined by the determination unit. When the determination unit is to select first target partial image data which is one partial image data of a selection target at a present time:

(A) in a first case where each line image data of a first group of N lines of line image data which are continuously aligned is a first type of line image data representing a line image to be printed by only one specific color of ink among the plurality of colors of ink, the determination unit may be configured to select the first group of N lines of line image data as the first target partial image data, so as to determine an opposite direction of a direction of the main scanning of a previous time as a direction of the main scanning for printing a first target partial image represented by the first target partial image data;

(B) in a second case where each line image data of the first group of N lines of line image data is a second type of line image data representing a line image to be printed by two or more colors of ink among the plurality of colors of ink, the determination unit may be configured to select the first group of N lines of line image data as the first target partial image data, so as to determine a particular direction as the direction of the main scanning for printing the first target partial image; and (C) in a third case where N1 lines (N1 being an integer less than N) of target line image data represent N1 lines of target line images to be printed by only the one specific color of ink, and (N−N1) lines of remaining line image data include the second type of line image data, the N1 lines of target line image data being continuously aligned from line image data constituting an edge on the first side within the first group of N lines of line image data toward the second side, and the (N−N1) lines of remaining line image data being line image data excluding the N1 lines of target line image data among the first group of N lines of line image data, the determination unit may be configured to select only the N1 lines of target line image data as the first target partial image data, so as to determine the opposite direction of the direction of the main scanning of the previous time as the direction of the main scanning for printing the first target partial image, and the determination unit may be configured to select a second group of N lines of line image data as second target partial image data, so as to determine the particular direction as a direction of the main scanning for printing a second target partial image represented by the second target partial image data, the second group of N lines of line image data including the (N−N1) lines of remaining line image data and N1 lines of additional line image data, the N1 lines of additional line image data being adjacent to the (N−N1) lines of remaining line image data, the N1 lines of additional line image data being continuously aligned toward the second side.

A control method and a computer program for realizing the controlling device, and a non-transitory computer readable storage medium that stores the computer program are also novel and useful. Further, a print system comprising the controlling device and the print performing unit is also novel and useful.

BRIEF DESCRIPTION OF THE DRAWINGS

FIG. 2 shows an example of printing of an image performed in a comparative example and each embodiment. FIG. 3 shows an example of printing of an image performed in a comparative example and each embodiment. FIG. 8 shows how line image data of cases A to C is counted. FIG. 9 shows how line image data of cases D to F is counted. FIG. 10 shows how line image data of cases G to I is counted. FIG. 11 shows how line image data of cases J to L is counted.

EMBODIMENT (First Embodiment)
(Configuration of System)

Figure 1:
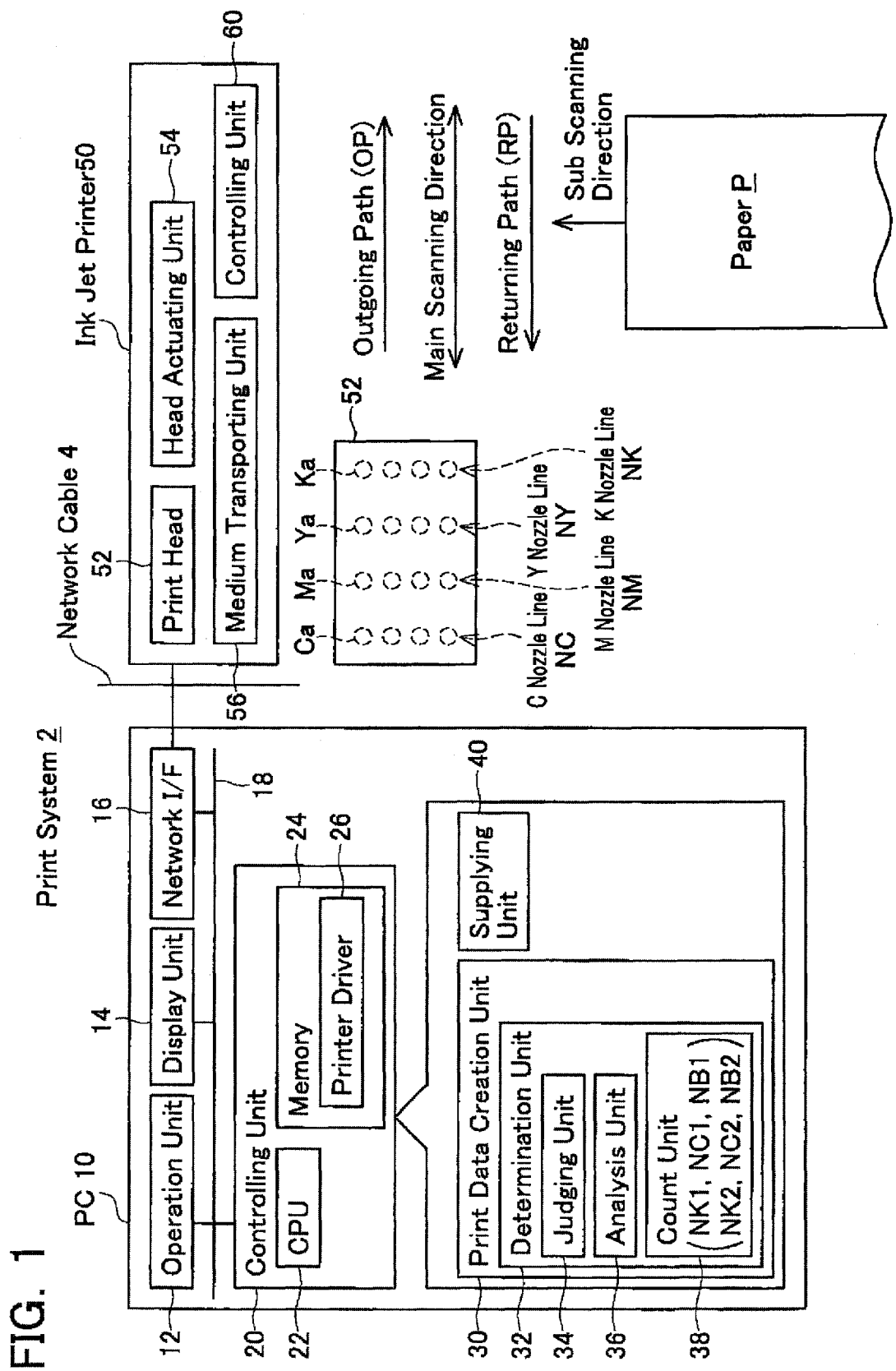
FIG. 1 shows the configuration of a print system.

As shown in FIG. 1, a print system 2 comprises a PC 10 and an ink jet printer 50 that is a peripheral of the PC 10. The PC 10 and the ink jet printer 50 are capable of communicating with one another via a network cable 4 (i.e., a network). Moreover, below, the ink jet printer 50 is shortened to the "printer 50".

(Configuration of PC 10)

The PC 10 comprises an operation unit 12, a display unit 14, a network interface 16 and a controlling unit 20. The units 12, 14, 16, 20 are connected to a bus line 18. The operation unit 12 consists of a keyboard and a mouse. A user can input various instructions to the PC 10 by operating the operation unit 12. The display unit 14 is a display for displaying various information. The network cable 4 is connected with the network interface 16.

The controlling unit 20 comprises a CPU 22 and a memory 24 consisting of a ROM, RAM, hard disk, etc. The CPU 22 executes various processes according to a program (e.g., a printer driver 26) stored in the memory 24. The CPU 22 realizes the functions of a print data creation unit 30 and a supplying unit 40 by performing processes according to the printer driver 26. Moreover, the print data creation unit 30 comprises a determination unit 32, and the determination unit 32 comprises a judging unit 34, an analysis unit 36 and a count unit 38. The count unit 38 includes a plurality of counters NK1, NC1, NB1, NK2, NC2, NB2.

The memory 24 stores the printer driver 26 for the printer 50. The printer driver 26 is installed in the PC 10 from a media packaged together with the printer 50. Moreover, in a variant, the printer driver 26 may be installed in the PC 10 via the internet from a server provided by the vendor of the printer 50.

(Configuration of Ink Jet Printer 50)

The printer 50 is a so-called serial type ink jet printer. The printer 50 comprises a print head 52, a head actuating unit 54, a medium transporting unit 56 and a controlling unit 60.

A simplified plan view of the print head 52 is shown in FIG. 1. As shown in the plan view, the print head 52 comprises four nozzle lines NC, NM, NY, NK for discharging ink droplets of four types of color including three types of chromatic color: cyan (C), magenta (M), and yellow (Y), and one type of achromatic color: black (K). The nozzle lines NC, etc. are arranged asymmetrically (i.e., are not arranged symmetrically in the manner NC, NM, NY, NK, NY, NM, NC) in a main scanning direction (i.e., the direction of movement of the print head 52). The nozzle lines NC, etc. include four nozzles for discharging ink droplets of a corresponding color. Four nozzles Ca, etc. that constitute the one nozzle line NC are aligned in the sub scanning direction (i.e., the transporting direction of paper P). The other nozzles NM, etc. also have the same configuration. Further, the nozzle lines NC, etc. are configured such that the four nozzles CMYK are positioned on a straight line extending in the main scanning direction. For example, the four nozzles Ca, Ma, Ya, Ka are positioned on a straight line extending in the main scanning direction. Moreover, below, a nozzle that constitutes the nozzle line NC (e.g., the nozzle Ca) is called a "C nozzle". Similarly, a nozzle of the other colors is called an "M nozzle", "Y nozzle" and "K nozzle".

The head actuating unit 54 causes the print head 52 to move back and forth along the main scanning direction while causing ink to be discharged from the print head 52 according to a command from the controlling unit 60 (i.e., causes main scanning of the print head 52 to be performed). Moreover, in the present embodiment, causing the print head 52 to move while causing ink to be discharged from the print head 52 is expressed as "main scanning", and causing the print head 52 to move without causing ink to be discharged from the print head 52 (e.g., "return" of FIG. 2, etc.) is not expressed as "main scanning". Further, below, the outgoing path and returning path in the main scanning of the print head 52 are expressed by the letters OP (Outgoing Path) and RP (Returning Path) respectively.

According to a command from the controlling unit 60, the medium transporting unit 56 takes the paper P housed in a paper input tray from that paper input tray, and transports the paper P along a sub scanning direction, this being a direction orthogonal to the main scanning direction.

The controlling unit 60 controls the operation of the head actuating unit 54 and the medium transporting unit 56 according to print data supplied from the PC 10.

(Outline of Printing an Image Realized by Present Embodiment)

By operating the operation unit 12, the user of the PC 10 can use an application program such as word processing software, spreadsheet software, drawing software, etc. Further, the user can give a command to the operation unit 12 for printing an image represented by target data created by the application.

FIG. 2 and FIG. 3 show images I1 to I5 of a printing target represented by the target data. The images I1, etc. are not images to be printed across two or more sheets of paper, but are images to be printed on one sheet of paper (i.e., one page's worth of image). Moreover, in FIG. 2 and FIG. 3, the left-right direction of the images I1, etc. corresponds to the main scanning direction, and the up-down direction of the images I1, etc. corresponds to the sub scanning direction. In particular, an upper side of the images I1, etc. corresponds to a downstream side in the sub scanning direction, and a lower side of the images I1, etc. corresponds to an upstream side in the sub scanning direction. That is, the upper side of the images I1, etc. is printed by earlier main scanning, and the lower side of the images I1, etc. is printed by later main scanning. Moreover, below, the direction corresponding to the sub scanning direction (i.e., the up-down direction), the side corresponding to the upstream side of the sub scanning direction (i.e., the lower side), and the side corresponding to the downstream side of the sub scanning direction (i.e., the upper side) are shortened to the "sub scanning direction", the "upstream side" and the "downstream side" respectively.

An area KA (K Area) within the images I1, etc. indicates an area to be printed only by K ink (i.e., a monochrome image area), and an area COA (Color Area) indicates an area to be printed by two or more colors of ink from among CMYK (i.e., a color image area). Further, an area BA (Blank Area) of FIG. 3 (D1), (D2) indicates an area not to be printed by any of the colors of ink CMYK.

(Prerequisites for Printing)

In the present embodiment, printing is performed according to the following prerequisites. Moreover, below, an area to be printed by one time of main scanning of the print head 52 is called a "unit area". In the present embodiment, the outgoing path OP is always used as the direction of main scanning for printing the unit area that includes the area COA.

The reason for using the outgoing path OP is as follows. In the case where a color image is to be printed, the printer 50 usually forms one picture element on the paper using two or more colors of ink from among CMYK. For example, in case a green picture element is to be formed, the printer 50 causes C ink droplets and Y ink droplets to adhere to the same position on the paper, forming one green picture element on the paper. As is clear from the positional relationship of the nozzle line NC and the nozzle line NY of FIG. 1, if outgoing path OP main scanning is performed to form the green picture element, for example, after Y ink droplets discharged from a nozzle Ya have adhered to a predetermined position on the paper, C ink droplets discharged from a nozzle Ca adhere to the same predetermined position. That is, the one green picture element is formed by the C ink droplets adhering above the Y ink droplets. On the other hand, if returning path RP main scanning is performed to form the green picture element, for example, after the C ink droplets discharged from the nozzle Ca have adhered to a predetermined position on the paper, the Y ink droplets discharged from the nozzle Ya adhere to the same predetermined position. That is, the one green picture element is formed by the Y ink droplets adhering above the C ink droplets. Consequently, because the order in which the C and Y ink droplets for forming the one green picture element adhere to the paper is different in the case of performing the outgoing path OP main scanning and the case of performing the returning path RP main scanning, the color appearance of the green picture element may differ. Thus, in order to avoid the occurrence of the phenomenon in which the color appearance of a printed image differs due to the two or more colors of ink adhering to the paper in a different order, the outgoing path OP main scanning is always used for printing a unit area that includes the area COA. Moreover, below, main scanning for printing a unit area that includes the area COA is called a "color path".

Further, in the present embodiment, either the outgoing path OP or the returning path RP is used selectively as the direction of main scanning for printing a unit area that includes only the area KA. More specifically, in case the main scanning of a previous time was the outgoing path OP, the returning path RP is used as the direction of main scanning for printing the unit area that includes only the area KA. Further, in case the main scanning of the previous time was the returning path RP, the outgoing path OP is used as the direction of main scanning for printing the unit area that includes only the area KA. That is, the opposite direction to the direction of main scanning of the previous time is used as the direction of main scanning for printing the unit area that includes only the area KA. This is because, in case of printing the unit area that includes only the area KA, the order in which the ink droplets adhere to the paper does not need to be taken into consideration.

In case the direction of main scanning of the previous time is the outgoing path OP, if the outgoing path OP (i.e., the same direction as the direction of main scanning of the previous time) were used as the direction of main scanning for printing the unit area that includes only the area KA, the print head 52 would have to be returned to the starting position of the outgoing path OP main scanning. That is, the movement of the returning path RP of the print head 52 would have to be performed in a state where ink is not being discharged from the print head 52. Therefore, the time required for printing would become longer. Consequently, in the present embodiment, the opposite direction to the direction of main scanning of the previous time is used as the direction of main scanning for printing the unit area that includes only the area KA. Moreover, below, the main scanning for printing the unit area that includes only the area KA is called a "black path". Further, moving the print head 52 in a state where ink is not being discharged from the print head 52 is called a "return path".

Moreover, in FIG. 2 and FIG. 3, the vertical rectangles arranged at the left and right of the images I1, etc. indicate the print head 52. The portions shown with hatching within the rectangles indicate that ink is being discharged from the nozzles, and the portions without hatching within the rectangles indicate that ink is not being discharged from the nozzles.

(Printing of FIG. 2(A1), (A2))

In the image I1 of FIG. 2(A1), (A2), the area KA, the area COA, and the area KA are aligned in sequence from the downstream side to the upstream side (i.e., from the upper side to the lower side in the figure). Each of the two areas KA has a length, in the sub scanning direction, corresponding to two nozzles (i.e., two raster's worth of length (that is to say, the length of two nozzle pitches)). The area COA has a length, in the sub scanning direction, corresponding to eight nozzles (i.e., the length of eight rasters). That is, the image I1 has a total length, in the sub scanning direction, of twelve rasters. As described above, the nozzle lines NY, etc. of the print head 52 include four nozzles aligned in the sub scanning direction. Consequently, in order to print the image I1, at least three times (12 rasters/four nozzles) of main scanning is required.

In the comparative example of FIG. 2(A1), in the first time of main scanning of the print head 52, printing is always performed of four raster's worth of area, this corresponding to the number of all the nozzles (i.e., "4") included in one nozzle line. More specifically, in the first time of main scanning, two raster's worth of the area KA are printed by two K nozzles arranged at the downstream side (i.e., the upper side of FIG. 1), and two raster's worth of the area at the furthest downstream side within the area COA are printed by any of the nozzles (e.g., two C nozzles and two Y nozzles) from among the eight nozzles CMYK arranged at the upstream side (i.e., the lower side of FIG. 1). Consequently, since the unit area to be printed by the first time of main scanning includes the area COA, the first time of main scanning is the color path of the outgoing path OP (1). When the first time of main scanning ends, the paper P is transported for the distance of four nozzle pitches (i.e., the distance of four rasters).

Since the unit area to be printed by a second time of main scanning includes only the area COA, the second time of main scanning is the color path of the outgoing path OP. Consequently, after the first time of main scanning has ended, the return path is performed (2), then the color path of the outgoing path OP, which is the second time of main scanning, is performed (3), then the paper P is transported for the distance of four nozzle pitches. Since the unit area to be printed by a third time of main scanning includes the area COA and the area KA, the third time of main scanning is the color path of the outgoing path OP. Consequently, after the second time of main scanning has ended, the return path is performed (4), then the color path of the outgoing path OP, which is the third time of main scanning, is performed (5).

In the comparative example of FIG. 2(A1), the number of times of the color path is three, and the total number of paths is five. Thus, when the printing of the image I1 is performed, the number of boundaries between two color images (simply called "color image boundary" below) on the paper formed by two consecutive times of color paths is two. When the user sees the printed image on the paper P, the boundary between two monochrome images on the paper formed by two consecutive times of black paths is relatively difficult to see. However, since a color image is formed by a plurality of colors of ink, it is relatively easy for the user to see the color image boundary. Consequently, when there are many color image boundaries in a printed image, the user might perceive the printed image as a low-quality image. In order to suppress the user having such a perception, the method of FIG. 2(A2) is used in the present embodiment.

As described above, in the comparative example of FIG. 2(A1), the printing of four raster's worth of area is performed in the first time of main scanning. By contrast, in the present embodiment of FIG. 2(A2), only two raster's worth of the area KA is printed in the first time of main scanning even though the print head 52 is capable of printing four raster's worth of area. That is, the first time of main scanning is the black path of the outgoing path OP (1). When the first time of main scanning ends, the paper P is transported for the distance of two nozzle pitches.

Then the return path is performed (2), and next, in order to print four raster's worth of the color area COA, the color path of the outgoing path OP, which is the second time of main scanning, is performed (3), and then the paper P is transported for the distance of four nozzle pitches. Next, the return path is performed (4), and then, in order to print four raster's worth of the color area COA, the color path of the outgoing path OP, which is the third time of main scanning, is performed (5), and then the paper P is transported for the distance of four nozzle pitches. Since a unit area to be printed by a fourth time of main scanning includes only the area KA, the fourth time of main scanning is the black path of the returning path RP, which is the opposite direction to the main scanning of the previous time (the outgoing path OP) (6).

As described above, in the present embodiment, the number of times of the color path is two, and the total number of paths is six. The number of times of the color path (two) of the present embodiment is less than in the comparative example (three). When the printing of the image I1 is performed in this manner, the number of color image boundaries is one. Consequently, when the method of the present embodiment is adopted (i.e., the method in which only three or less raster's worth of the area KA is printed even though the print head 52 is capable of printing four raster's worth of area), the number of color image boundaries can be reduced compared to the method of the comparative example. Consequently, the user perceiving the printed image as a low-quality image can be suppressed (i.e., a high-quality printed image can be presented to the user).

(Printing of FIG. 3 (C1), (C2))

In an image I3 of FIG. 3 (C1), (C2), two raster's worth of the area KA, two raster's worth of the area COA, and four raster's worth of the area KA are aligned in sequence from the downstream side to the upstream side (i.e., from the upper side to the lower side in the figure). As described in FIG. 2 (A2), in the present embodiment, the method is adopted in which only three or less raster's worth of the area KA is printed even though the print head 52 is capable of printing four raster's worth of area. Consequently, if this method is adhered to faithfully, printing of the image I3 is performed as shown in the comparative example of FIG. 3 (C1).

That is, first, in order to print only two raster's worth of the area KA, the black path of the outgoing path OP is performed (1), and then the paper P is transported for the distance of two nozzle pitches. Next, the return path is performed (2), and then, in order to print four raster's worth of area including two raster's worth of the area COA and two raster's worth of the area at the downstream side within the area KA, the color path of the outgoing path OP is performed (3), and then the paper P is transported for the distance of four nozzle pitches. Then, in order to print two raster's worth of the area at the upstream side within the area KA, the black path of the returning path RP is performed (4). Thus, in the comparative example of FIG. 3 (C1), the total number of paths is four.

By contrast, in the first embodiment of FIG. 3 (C2), first, in order to print four raster's worth of area including two raster's worth of the area KA and two raster's worth of the area COA, the color path of the outgoing path OP is performed (1), and then the paper P is transported for the distance of four nozzle pitches. Then, in order to print four raster's worth of the area KA, the black path of the returning path RP is performed (2). Thus, in the first embodiment of FIG. 3 (C2), the total number of paths is two. That is, when the method of the present embodiment is adopted, the total number of paths can be reduced compared to the method of the comparative example. Consequently, printing can be performed rapidly.

Compared with the method of FIG. 2 (A2), the method of FIG. 3 (C2) can be expressed as follows. That is, as in the image I1 of FIG. 2 (A2), when four raster's worth of area SA1 including the area KA and the area COA are printed by one time of main scanning, in case a color image boundary is formed due to the areas COA being consecutive at the upstream side of the area SA1 (the lower side in the figure), a method is adopted (the method of FIG. 2 (A2)) to print only the area KA that is equal to or less than three nozzle pitches using the black path. However, as in the image I3 of FIG. 3 (C2), in case a color image boundary is not formed due to the area COA not being consecutive at the upstream side of the area SA2 (the lower side in the figure) when four nozzle pitches worth of area SA2 including the area KA and the area COA are printed by one time of main scanning, a method is adopted (the method of (FIG. 2 (C2)) to print the area SA2 using the color path. Thereby the total number of paths can be reduced.

(Printing of FIG. 3 (D1), (D2))

In an image I4 of FIG. 3 (D1), (D2), four raster's worth of the area COA, two raster's worth of the area BA, and four raster's worth of the area KA are aligned in sequence from the downstream side to the upstream side (i.e., from the upper side to the lower side in the figure).

In the comparative example of FIG. 3 (D1), first, in order to print four raster's worth of the area COA, the color path of the outgoing path OP is performed (1), and then the paper P is transported for the distance of four nozzle pitches. Then, in order to print two raster's worth of the area at the downstream side within the area KA, the black path of the returning path RP is performed (2). Moreover, in the black path of the returning path RP, eight CMYK (=4 colors×2 nozzles) nozzles arranged at the downstream side are opposite the area on the paper P corresponding to the area BA. Consequently, in the black path of the returning path RP, ink is not discharged from these eight nozzles. When the black path of the returning path RP ends, the paper P is transported for the distance of four nozzle pitches. Then, in order to print two raster's worth of the area at the upstream side in the area KA, the black path of the outgoing path OP is performed (3). Thus, in the comparative example of FIG. 3 (D1), the total number of paths is three.

By contrast, in the first embodiment of FIG. 3 (D2), in order to print four raster's worth of the area COA, when the color path of the outgoing path OP is performed (1), the paper P is transported for the distance of six nozzle pitches, unlike the comparative example. Thereby, in the second time of main scanning, the nozzles are no longer opposite the area on the paper P corresponding to the area BA. Then, in order to print four raster's worth of the area KA, the black path of the returning path RP is performed (2). Thus, in the first embodiment of FIG. 3 (D2), the total number of paths is two. That is, in the present embodiment, as much as possible, main scanning is not performed in the state where the nozzles are opposite the area on the paper P corresponding to the area BA, this allowing the total number of paths to be reduced. Consequently, rapid printing can be performed.

(Printing of FIG. 3 (E1), (E2))

In an image I5 of FIG. 3 (E1), (E2), two raster's worth of the area KA and two raster's worth of the area COA are aligned in sequence from the downstream side to the upstream side (i.e., from the upper side to the lower side in the figure). The area COA includes a rear edge of the image I5 (i.e., an upstream side edge). If the method of FIG. 2 (A2) is adhered to faithfully, printing of the image 15 is performed as shown in the comparative example of FIG. 3 (E1).

That is, first, in order to print only two raster's worth of the area KA, the black path of the outgoing path OP is performed (1), and then the paper P is transported for the distance of two nozzle pitches. Then, the return path is performed (2), and then, in order to print two raster's worth of the area COA, the color path of the outgoing path OP is performed (3). Thus, in the comparative example of FIG. 3 (E1), the total number of paths is three.

By contrast, in the first embodiment of FIG. 3 (E2), in order to print four raster's worth of area including two raster's worth of the area KA and two raster's worth of the area COA, the color path of the outgoing path OP is performed (1). Thus, in the first embodiment of FIG. 3 (E2), the total number of paths is one. That is, in the present embodiment, in case an area SA3 that is equal to or less than four raster's worth of area and includes the area KA and the area COA, includes the rear edge of the image I5, a method is adopted to print the area SA3 using the color path. Thereby, the total number of paths can be reduced. Consequently, rapid printing can be performed.

(Processes Performed by PC 10; FIG. 4 to FIG. 7)

Next, the contents of processes performed by the PC 10 in order to realize the printing of the present embodiment of FIG. 2 and FIG. 3 will be described. In case the user of the PC 10 gives a command to the operation unit 12 for printing target data, the controlling unit 20 performs the processes of the flowcharts of FIG. 4 and FIG. 5 according to the printer driver 26. Moreover, the printing command includes a print resolution designated by the user.

Moreover, below, the contents of the processes are described assuming that the target data is one page's worth of data which represents one page's worth of image. For example, in case target data worth two or more pages is present, after the processes of FIG. 4 and FIG. 5 have ended for the first page of target data, the processes of FIG. 4 and FIG. 5 may be re-performed for the second page of target data.

First, in S10, the print data creation unit 30 (see FIG. 1) performs a process to convert the target data into RGB image data, acquiring RGB image data that has a number of pixels corresponding to the print resolution designated by the user. Each of the plurality of pixels constituting the RGB image data is expressed by 256 tone RGB values.

Then, in S12 the print data creation unit 30 performs a color conversion process on the RGB image data, creating CMYK image data ID. Each of the plurality of pixels constituting the CMYK image data ID is expressed by 256 tone CMYK values. The number of pixels of the CMYK image data ID is the same as the number of pixels of the RGB image data.

Figure 4:
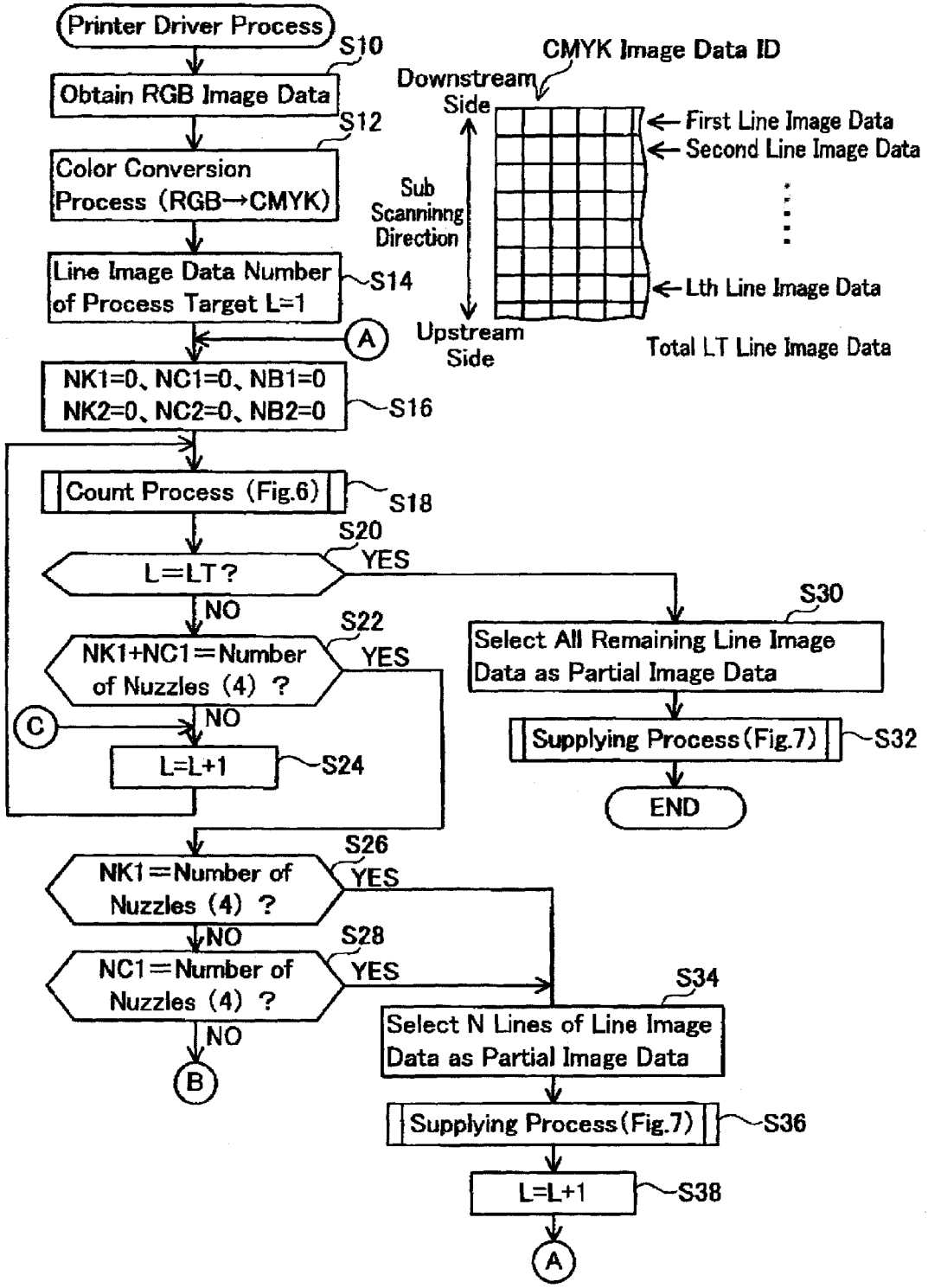
FIG. 4 shows a flowchart of a printer driver process.

As shown in FIG. 4, the CMYK image data ID includes a plurality of lines (specifically, LT lines) of line image data. One line image represented by one line of line image data is printed by four nozzles (e.g., Ca, Ma, Ya, Ka of FIG. 1) positioned on a straight line extending along the main scanning direction. Consequently, in case one time of main scanning is performed while ink is being discharged from all 16 nozzles (=4 colors×4 nozzles), four line images represented by four consecutive lines of line image data are printed. Below, the four consecutive lines of line image data are called "N lines of line image data (i.e., N is the number of all the nozzles included in one nozzle lines)".

Further, within the LT lines of line image data, a line image represented by line image data present at an upper side of FIG. 4 is printed by earlier main scanning, and a line image represented by line image data present at a lower side of FIG. 4 is printed by later main scanning. Consequently, the LT lines of line image data are aligned along a direction corresponding to the sub scanning direction. Further, the line image data includes a plurality of pixels aligned along a direction corresponding to the main scanning direction. Moreover, below, the line image data present at the furthest downstream side in the sub scanning direction is called "first line image data", and is called "second, third . . . Lth line image data" as one proceeds toward the upstream side.

Then, in S14, the determination unit 32 (see FIG. 1) determines "1" as a number L indicating line image data (called "object line image data" below) which is the target of the processes from S16 onwards. Thereby, the first line image data becomes the target of the processes from S16 onwards, described below. Then, in S16, the count unit 38 (see FIG. 1) sets a counted value of all the counters NK1, etc. to "0". Next, in S18, the analysis unit 36 (see FIG. 1) and the count unit 38 perform a count process.

Figure 6:
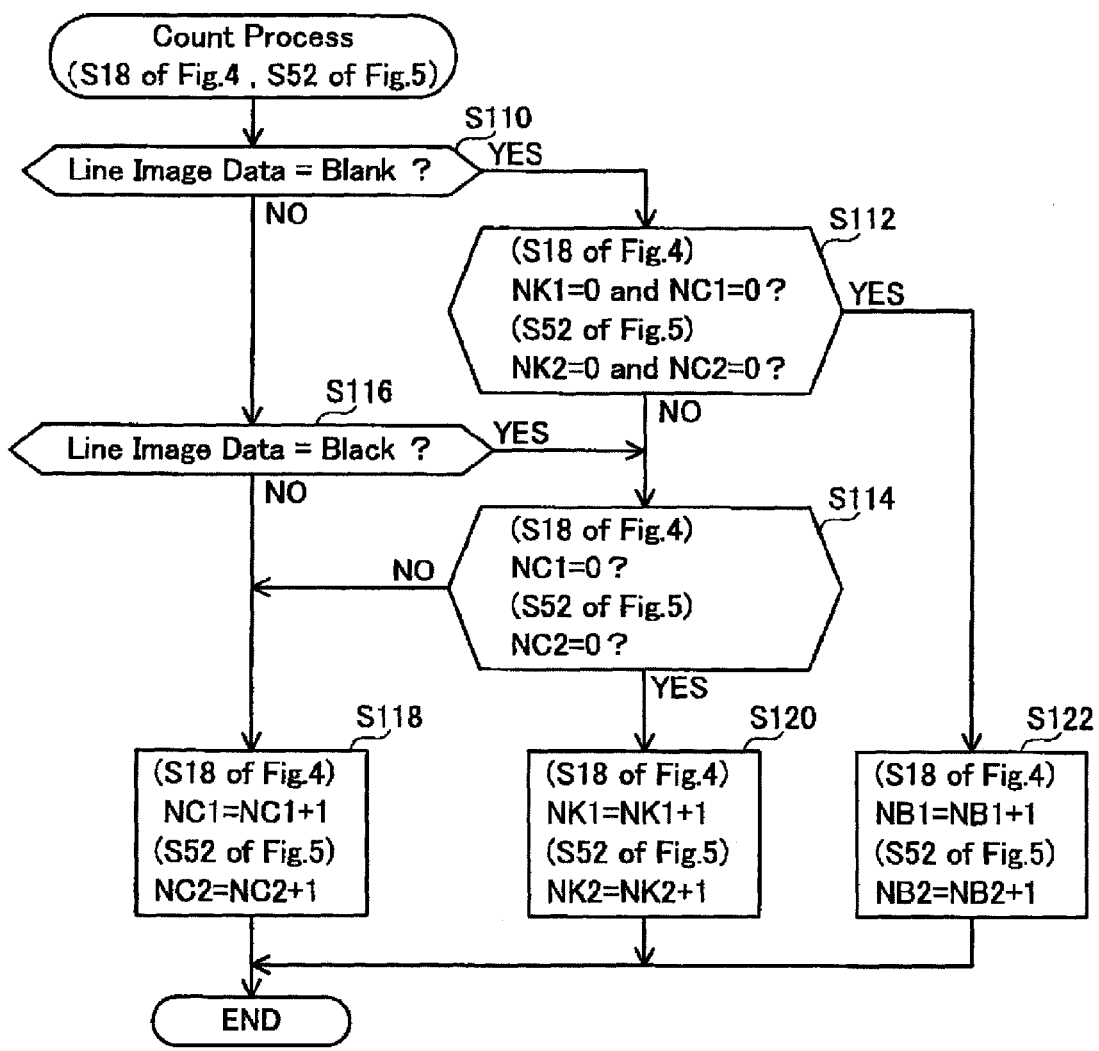
FIG. 6 shows a flowchart of a count process.

(Count Process; FIG. 6)

As shown in FIG. 6, in the count process of S18 of FIG. 4, in S110, the analysis unit 36 analyzes the object line image data (e.g., the first line image data), and judges whether the object line image data is line image data which represents a blank line image which is not to be printed by any color of ink CMYK (called "blank line image data" below). Specifically, for each of the pixels included in the object line image data, the analysis unit 36 reads the CMYK values of the pixel. In the case that the CMYK values of all the pixels are "0", the analysis unit 36 judges that the object line image data is blank line image data (YES in S110), and proceeds to S112. On the other hand, in the case that the CMYK values of all the pixels are not "0" (i.e., in the case that at least one value in the CMYK values of at least one pixel is equal to or more than "1"), the analysis unit 36 judges that the object line image data is not blank line image data (NO in S110), and proceeds to S116.

In S116, the analysis unit 36 analyzes the object line image data, and judges whether the object line image data is line image data which represents a black line image (i.e., a monochrome line image) which is to be printed only by K ink (called "black line image data" below). Specifically, for each of the pixels included in the object line image data, the analysis unit 36 reads the CMYK values of the pixel. In the case that the CMY values of all the pixels are "0", the analysis unit 36 judges that the object line image data is black line image data (YES in S116), and proceeds to S114. On the other hand, in the case that the CMY values of all the pixels are not "0" (i.e., in the case that at least one value in the CMY values of at least one pixel is equal to or more than "1"), the analysis unit 36 judges that the object line image data is not black line image data (NO in S116), and proceeds to S118.

Moreover, the case of NO in S116 means that the object line image data is line image data which represents a color line image to be printed by at least one color of ink from among CMY (called "color line image data" below). In color line images which are actually printed, printing using only one color of ink from among CMY occurs rarely, and printing using two or more colors of ink from among CMYK occurs often. Consequently, in S116, the analysis unit 36 judging, as a standard, whether at least one value within the CMY values of at least one pixel is equal to or more than "1" is equal to judging that the object line image data is either black line image data or color line image data which represents a color line image to be printed by two or more colors of ink from among CMYK.

In S112, the count unit 38 judges whether NK1=0 and NC1=0. In case NK1=0 and NC1=0, the count unit 38 judges YES in S112 and proceeds to S122, and in case at least one of NK1 and NC1 is equal to or more than "1", the count unit 38 judges NO in S112 and proceeds to S114. In S114, the count unit 38 judges whether NC1=0. In case NC1=0, the count unit 38 judges YES in S114 and proceeds to S120, and in case NC1 is equal to or more than "1", the count unit 38 judges NO in S114 and proceeds to S118.

In S118, the count unit 38 adds "1" to NCI. In S120, the count unit 38 adds "1" to NK1. In S122, the count unit 38 adds "1" to NB1. When S118, S120 or S122 ends, the count process ends.

As is clear from the above description, the counters NK1, NC1, NB1 can be expressed as follows. In case the object line image data is color line image data (the case of NO in S116), NC1 is the counter which starts counting. Further, in case NC1=0 and the object line image data is the black line image data (the case of YES in S114), NK1 starts the counting of the number of lines of line image data, and in case the object line image data is color line image data (the case of NO in S116), NK1 stops counting the number of lines of line image data. Further, in case NC1=0, NK1=0, and the object line image data is blank line image data (the case of YES in S112), NB1 starts the counting of the number of lines of line image data, and in case the object line image data is color or black line image data (the case of NO in S110), NB1 stops counting the number of lines of line image data.

(Processes from S20 of FIG. 4 Onward)

When the count process S18 of FIG. 4 ends, in S20 the determination unit 32 judges whether the number L that indicates the object line image data is equal to the total number of lines LT of line image data included in the CMYK image data. In case the number L is equal to LT (in case of YES in S20), the determination unit 32 proceeds to S30, and in case the number L is less than LT (in case of NO in S20), the determination unit 32 proceeds to S22.

In S30, the determination unit 32 selects, as partial image data, all the line image data (called "unprocessed line image data" below) for which a supplying process of FIG. 7 (to be described) has not been performed. For example, in the unprocessed line image data, in case the line image data present at the furthest downstream side is LT−3 line image data, the determination unit 32 selects, as the partial image data, four lines of line image data from the LT−3 line image data to LT-th line image data (i.e., line image data constituting an edge on the upstream side of an image represented by the CMYK image data ID). When S30 ends, the determination unit 32 proceeds to a supplying process of S32. The supplying process will be described later.

Moreover, in S30, in case one or more lines of consecutive blank line image data are present at the furthest downstream side within the unprocessed line image data (i.e., in case NB1>1, and NK1>1 and/or NC1>1), the determination unit 32 does not select the one or more lines of consecutive blank line image data as the partial image data. In this case, as the partial image data, the determination unit 32 selects from the black or color line image data adjacent to the one or more lines of consecutive blank line image data to the LT-th line image data. Moreover, this point, in which the one or more lines of consecutive blank line image data that are present at the furthest downstream side within the unprocessed line image data are not selected as the partial image data, is also the same in S34 of FIG. 4, and S58, S62, S72, S80, S88, S92 of FIG. 5 (to be described).

Further, in S30, in case all the unprocessed line image data is blank line image data (i.e., in case NB1>1, NK1=0, and NC1=0), the determination unit 32 does not select partial image data. In this case, the determination unit 32 ends the printer driver process without performing the supplying process of S32. Moreover, in the case of all the unprocessed line image data being blank line image data, the point of not selecting partial image data and not performing the supplying process is also the same in S80, S82, S92, S94 of FIG. 5 (to be described).

In S22, the determination unit 32 judges whether the sum of the value of NK1 and the value of NC1 is equal to the number of all the nozzles included in one nozzle line (i.e., "4"). In case NK1+NC1=4 (in case of YES in S22), the determination unit 32 proceeds to S26, and in case NK1+NC1<4 (in case of NO in S22), the determination unit 32 proceeds to S24.

In S24, the determination unit 32 adds "1" to the number L that indicates the object line image data, and determines new object line image data. Upon ending S24, the determination unit 32 performs the count process of S18 for the new object line image data.

In S26, the determination unit 32 judges whether the value of NK1 is equal to the number of all the nozzles included in one nozzle line (i.e., "4"). In case NK1=4 (in case of YES in S26), the determination unit 32 proceeds to S34, and in case NK1<4 (in case of NO in S26), the determination unit 32 proceeds to S28.

In S28, the determination unit 32 judges whether the value of NC1 is equal to the number of all the nozzles included in one nozzle line (i.e., "4"). In ease NC1=4 (in case of YES in S28), the determination unit 32 proceeds to S34, and in case NC1<4 (in case of NO in S28), the determination unit 32 proceeds to S50 of FIG. 5.

In S34, the determination unit 32 selects the partial image data. In S34, which is performed in the case of YES in S26 (in case NK1=4), the determination unit 32 selects, as the partial image data, N lines of line image data which include the black line image data present at the furthest downstream side within the unprocessed line image data. Further, in S34, which is performed in the case of YES in S28 (in case NC1=4), the determination unit 32 selects, as the partial image data, N lines of line image data which include the color line image data present at the furthest downstream side within the unprocessed line image data. Upon ending S34, the determination unit 32 proceeds to a supplying process of S36.

(Supplying Process; FIG. 7)

Next, the contents of the supplying processes of S32, S36 of FIG. 4 will be described. The supplying process of S32 and the supplying process of S36 are an identical process, and is performed according to the flowchart of FIG. 7. In S140, the determination unit 32 judges whether the selected partial image data includes color line image data. Moreover, in the supplying process of S32 of FIG. 4, the partial image data selected in S30 is the "selected partial image data", and in the supplying process of S36 of FIG. 4, the partial image data selected in S34 is the "selected partial image data".

In case the selected partial image data includes color line image data (in case of YES in S140), in S142 the determination unit 32 determines that the direction of main scanning for printing a partial image represented by the selected partial image data (called "main scanning direction of the present time" below) is the outgoing path OP. Upon ending S142, the determination unit 32 proceeds to S146.

Figure 7:
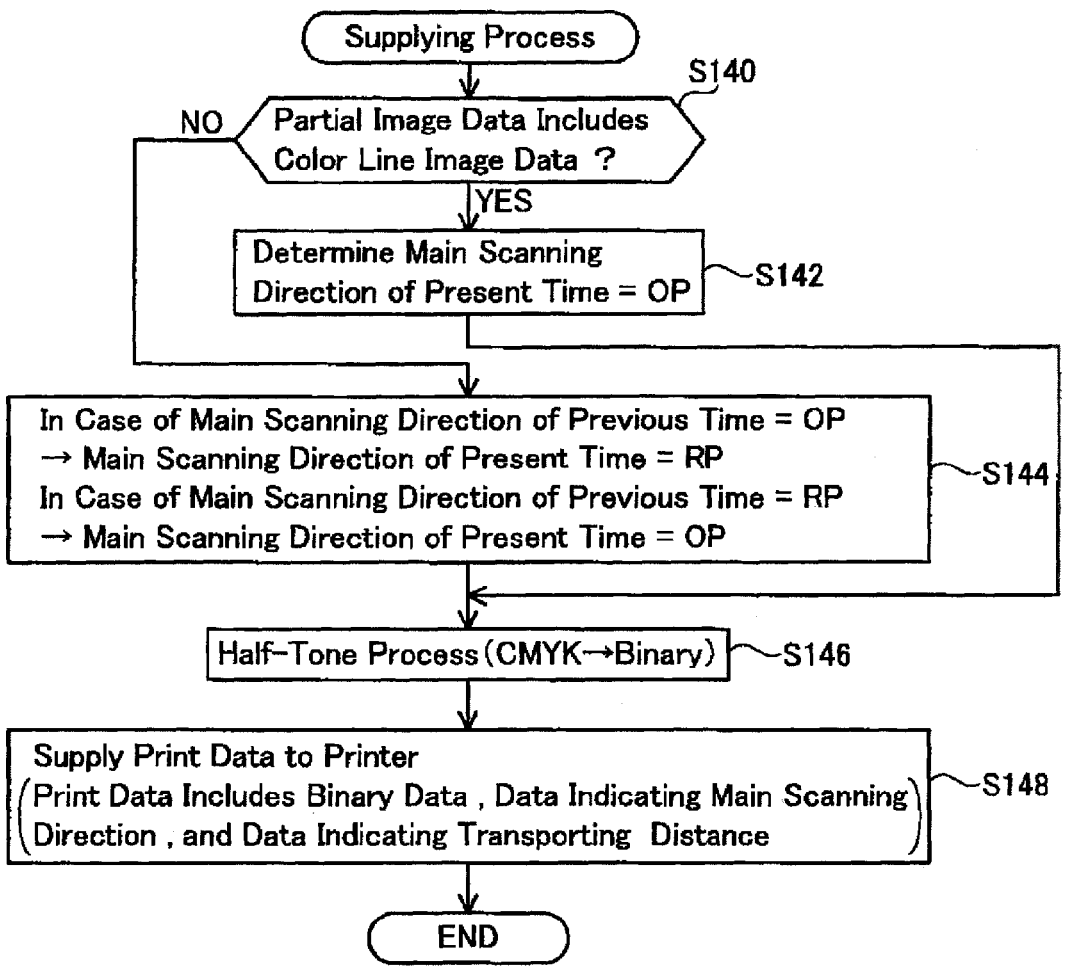
FIG. 7 shows a flowchart of a supplying process.

On the other hand, in case the selected partial image data does not include color line image data (in case of NO in S140), in S144 the determination unit 32 determines that the main scanning direction of the present time is the opposite direction to the main scanning direction of the previous time (i.e., the direction of main scanning determined in the previous time of the supplying process of FIG. 7). That is, in case the main scanning direction of the previous time was determined to be the outgoing path OP, the determination unit 32 determines that the main scanning direction of the present time is the returning path RP, and in case the main scanning direction of the previous time was determined to be the returning path RP, the determination unit 32 determines that the main scanning direction of the present time is the outgoing path OP. Moreover, in case the main scanning direction of the previous time has not been determined, i.e., in S144 of the first supplying process, the determination unit 32 determines, for the sake of convenience, that the main scanning direction of the present time is the outgoing path OP. Upon ending S144, the determination unit 32 proceeds to S146.

In S146, the print data creation unit 30 performs a half-tone process on the selected partial image data (e.g., a half-tone process using the error diffusion method), creating binary data. Specifically, from one pixel represented by the CMYK values included in the selected partial image data, the print data creation unit 30 creates one new pixel represented by the four values corresponding to CMYK. The values of the new pixel created here are expressed in binary which represents dot ON (i.e., a pixel is formed) or dot OFF (i.e., a pixel is not formed). The binary data is completed when new pixels have been created from all the pixels included in the selected partial image data. Moreover, in a variant, in S146 the print data creation unit 30 may create new pixels expressed by three or more values (e.g., large dot ON, medium dot ON, small dot ON, and dot OFF). Moreover, in S146, the print data creation unit 30 further assigns, for each of the pixels included in the binary data, a nozzle that is to discharge ink droplets onto a position on the paper P corresponding to that pixel.

Then, in S148, the print data creation unit 30 creates print data that includes the binary data created in S146, data indicating the main scanning direction determined in S142 or S144, and data indicating a transporting distance. Moreover, in case the sum of the values of the three counters NK1, NC1, NB1 is "X (X being an integer equal to or greater than 1)", the print data creation unit 30 creates data indicating a transporting distance of X nozzle pitches. This can be expressed in other words as follows. That is, in case the sum of a number of lines Y (Y being an integer equal to or greater than 1) of line image data included in the selected partial image data and a number of lines Z (Z being an integer equal to or greater than 0) of consecutive blank line image data adjacent to the downstream side of the selected partial image data is X, the print data creation unit 30 creates data indicating the transporting distance of X nozzle pitches. Moreover, in a supplying process of S64, etc. of FIG. 5 (to be described), a counter that is referred to so as to create the data indicating the transporting distance can be different from the counters NK1, NC1, NB1. However, the point in which data is created that indicates the transporting distance of X (=Y+Z) nozzle pitches is the same as in the supplying process of S36.

In S148, further, the supplying unit 40 (see FIG. 1) supplies the print data to the printer 50 via the network interface 16 (further, via the network cable 4).

Upon receiving the print data from the PC 10, the controlling unit 60 of the printer 50 first controls the medium transporting unit 56 according to the data (i.e., X nozzle pitches) indicating transporting distance included in the print data. Thereby, the medium transporting unit 56 transports the paper P for X nozzle pitches. Then, the controlling unit 60 controls the head actuating unit 54 according to the binary data and the data indicating the main scanning direction included in the print data. Thereby, while causing the ink to be discharged from the nozzles according to the binary data, the head actuating unit 54 causes the main scanning of the print head 52 to be performed in the direction indicated by the data indicating the main scanning direction (the outgoing path OP or returning path RP). Moreover, in case the direction indicated by the data indicating the main scanning direction (i.e., the main scanning direction of the present time) is the same direction as the main scanning direction of the previous time, the head actuating unit 54 causes the main scanning of the print head 52 to be performed after having caused the return path of the print head 52 to be performed.

Moreover, when the supplying process of S32 of FIG. 4 is performed, the printer driver process ends. On the other hand, when the supplying process of S36 of FIG. 4 is performed, in S38 the determination unit 32 adds "1" to the number L that indicates the object line image data, and determines new object line image data. When S38 ends, the determination unit 32 returns to S16, sets the counted value of the counters NK1, etc. to "0", and re-performs the processes from S18 onward.

(Various Cases Realized by Processes S14 to S38 of FIG. 4; FIG. 8, FIG. 9, FIG. 11)

Next, various cases realized by the processes S14 to S38 of FIG. 4 will be described. Moreover, in FIG. 8 to FIG. 11, line image data represented by "K", "CO", "B" is black, color, and blank line image data respectively. Moreover, in particular, the color line image data represented by "CO" is color line image data which represents a line image to be printed by two or more colors of ink from among CMYK.

(Case A of FIG. 8)

In case A, all of L-th to L+4 line image data in the CMYK image data ID is black line image data. The count unit 38 performs the count process of Lth black line image data (S18 of FIG. 4), and increments NK1 to "1" (S120 of FIG. 6). Similarly, the count unit 38 sequentially performs the count process of the L+1 to L+3 black line image data (S18 of FIG. 4), and sequentially increments NK1 to "2", "3", "4" (S120 of FIG. 6). Thereby, the determination unit 32 judges YES in S22 of FIG. 4, judges YES in S26, and proceeds to S34.

In S34 of FIG. 4, the determination unit 32 selects the L-th to L+3 black line image data as the partial image data. Further, in the supplying process of S36 of FIG. 4, the determination unit 32 determines that the main scanning direction of the present time is the opposite direction to the main scanning direction of the previous time (S144 of FIG. 7). Further, the print data creation unit 30 creates data indicating a transporting distance corresponding to four nozzle pitches (S148 of FIG. 7), this being the sum of the number of lines Y of line image data included in the selected partial image data (Y=4), and the number of lines Z of consecutive blank line image data adjacent to the downstream side of the selected partial image data (Z=0) (i.e., the sum of the values of the three counters NK1, NC1, NB1). The supplying unit 40 supplies the print data to the printer 50 (S148 of FIG. 7). Thereby, while being caused to discharge only K ink, the printer 50 performs main scanning in the opposite direction to the main scanning direction of the previous time, thereby printing, onto the paper P, four lines of line image (monochrome image) represented by the L-th to L+3 black line image data.

Moreover, when the print data is supplied to the printer 50, in S16 of FIG. 4 the count unit 38 returns NK1 to "0". Then, the count unit 38 performs the count process of L+4 black line image data (S18 of FIG. 4), and increments NK1 to "1".

(Case B of FIG. 8)

In the following cases, descriptions that duplicate case A will be omitted. In case B, L+2 line image data is blank line image data, and the remaining line image data is black line image data. In this case, when the count process of the L+2 blank line image data is performed (S18 of FIG. 4), NK1=2. Consequently, the count unit 38 judges NO in S112 of FIG. 6, judges YES in S114, and increments NK1 to "3" (S120 of FIG. 6). That is, in the count process of the L+2 blank line image data (S18 of FIG. 4), NB1 is not incremented. Moreover, the case where L+1 and/or L+3 line image data is blank line image data is the same as case B.

(Case C of FIG. 8)

In case C, L-th and L+1 line image data is blank line image data, and L+2 to L+5 line image data is black line image data. In this case, the count unit 38 sequentially performs the count process of the L-th and L+1 blank line image data (S18 of FIG. 4), and sequentially increments NB1 to "1", "2" (S122 of FIG. 6). The count unit 38 sequentially performs the count process of the L+2 to L+5 black line image data (S18 of FIG. 4), and sequentially increments NK1 to "1", "2", "3", "4" (S120 of FIG. 6). Thereby, the determination unit 32 judges YES in S22 of FIG. 4, judges YES in S26, and proceeds to S34.

In S34 of FIG. 4, without selecting the L-th and L+1 blank line image data as the partial image data, the determination unit 32 selects the L+2 to L+5 black line image data as the partial image data. Moreover, in S148 of FIG. 7, the print data creation unit 30 creates data indicating a transporting distance corresponding to six nozzle pitches, this being the sum of the value of the three counters NK1, NC1, NB1.

(Case D of FIG. 9)

In case D, all the L-th to L+4 line image data is color line image data. The count unit 38 sequentially performs the count process of the L-th to L+4 color line image data (S18 of FIG. 4), and sequentially increments NCI to "1", "2", "3", "4" (S118 of FIG. 6). Thereby, the determination unit 32 judges YES in S22 of FIG. 4, judges NO in S26, judges YES in S28, and proceeds to S34.

In S34 of FIG. 4, the determination unit 32 selects the L-th to L+3 color line image data as the partial image data. Further, in the supplying process of S36 of FIG. 4, the determination unit 32 determines that the main scanning direction of the present time is the outgoing path OP (S142 of FIG. 7). In case D, while causing at least one color of ink from among CMY to be discharged, the printer 50 prints four lines of line image (color image) represented by the L-th to L+3 color line image data on the paper P.

(Case E, case F of FIG. 9)

In case E, L+2 line image data is blank line image data, and the remaining line image data is color line image data. Further, in case F, the L+2 line image data is black line image data, and the remaining line image data is color line image data. In both case E and F, when the count process of the L+2 blank or black line image data is performed (S18 of FIG. 4), NC1=2. Consequently, the count unit 38 judges NO in S114 of FIG. 6, and increments NC1 to "3" (S118 of FIG. 6). That is, in the count process of the L+2 blank or black line image data (S18 of FIG. 4), NB1 or NK1 is not incremented. Moreover, the case where L+1 and/or L+3 line image data is blank or black line image data is also the same as cases E and F.

(Case J of FIG. 11)

In case J, LT-3 to LT-1 line image data is black line image data, and LT-th line image data (i.e., line image data constituting an edge on the upstream side of the sub scanning direction) is color line image data. When the count process of the LT-th color line image data (S18 of FIG. 4) ends, the determination unit 32 judges YES in S20 of FIG. 4, and proceeds to S30.

In S30 of FIG. 4, the determination unit 32 selects the LT-3 to LT-th line image data as the partial image data. Further, in the supplying process of S32 of FIG. 4, the determination unit 32 determines that the main scanning direction of the present time is the outgoing path OP (S142 of FIG. 7).

Figure 5:
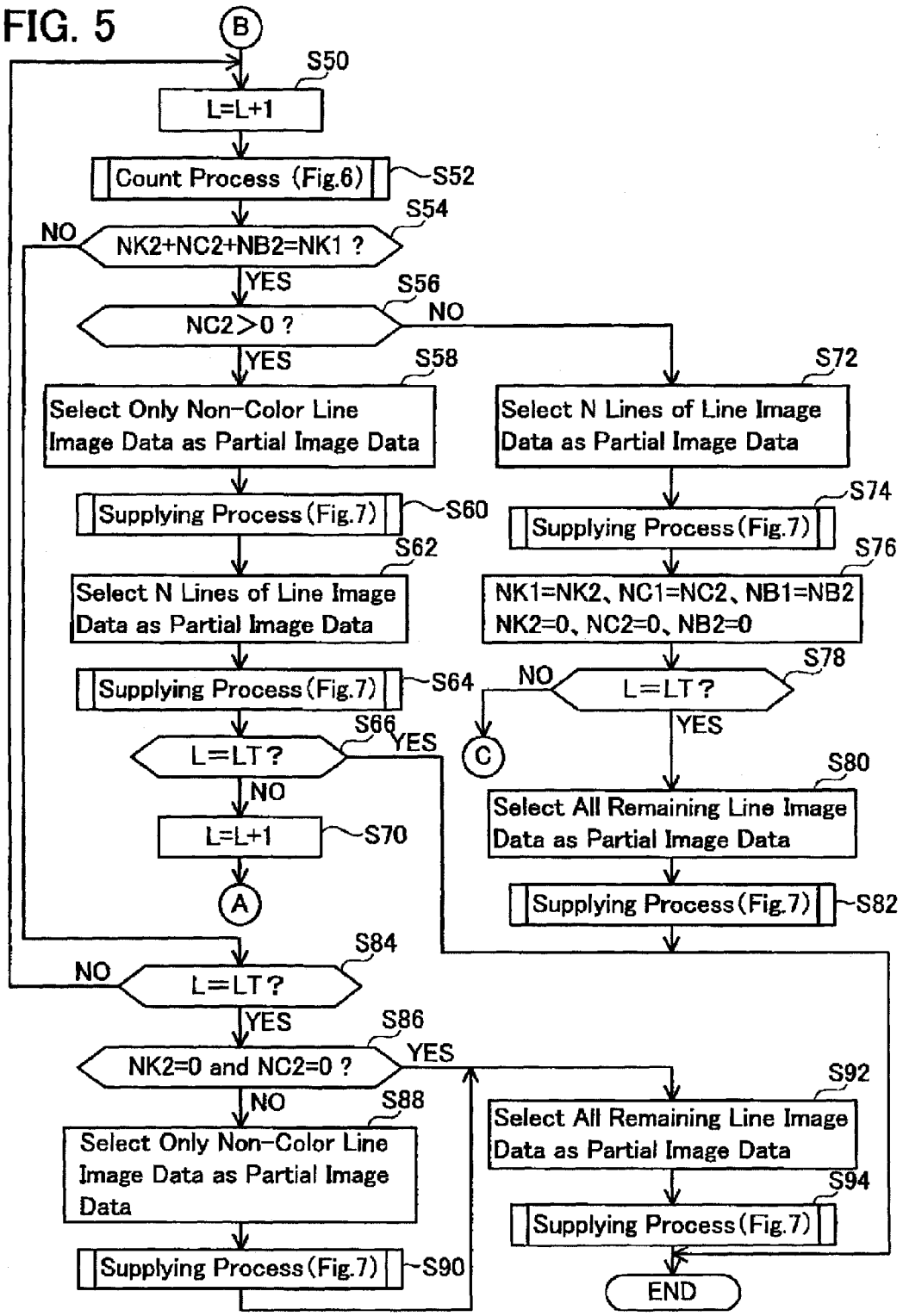
FIG. 5 shows a flowchart of a continuation of FIG. 4.

(Processes from S50 of FIG. 5 Onwards)

As described above, in the case where NO is judged in S28 of FIG. 4 (the case where NK1>1, and NC1>1), the determination unit 32 proceeds to S50 of FIG. 5. For example, in cases G, H, I of FIG. 10, NK1=3 and NC1=1 at the time when the count process of the L+3 line image data (S18 of FIG. 4) ends. In this case, the determination unit 32 judges YES in S22 of FIG. 4, judges NO in S26, judges NO in S28, and proceeds to S50 of FIG. 5.

That is, the determination unit 32 judges NO in S28 of FIG. 4, and proceeds to S50 of FIG. 5 in the case where the following specific condition is satisfied: within the unprocessed line image data present at the furthest downstream side for which the supplying process of FIG. 7 has not been performed, in N lines of line image data (e.g., the L-th to L+3 line image data of case G of FIG. 10), black line image data (e.g., the L-th to L+2 line image data of case G) is present at the downstream side, and color line image data (e.g., the L+3 line image data of case G) is present at the upstream side. Moreover, within the unprocessed line image data, in the case that one or more lines of blank line image data are present at the furthest downstream side (i.e., in case NB1>1), the N lines of line image data excluding the one or more lines of blank line image data are the "N lines of line image data present at the furthest downstream side".

In S50 of FIG. 5, the determination unit 32 adds "1" to the number L that indicates the object line image data, and determines new object line image data. When S50 ends, the count process of S52 is performed for the new object line image data. With the exception of the point of using counters NK2, NC2, NB2 instead of the counters NK1, NC1, NB1, the count process of S52 is the same as the count process of S18 of FIG. 4 (see FIG. 6).

In case the aforementioned specific condition is satisfied, the counters NK2, NC2, NB2 are set to a state of being able to start counting. As with the counters NK1, NC1, NB1, the counters NK2, NC2, NB2 can each be expressed as follows. In case the object line image data is color line image data (the case of NO in S116 of FIG. 6), NC2 is the counter which starts counting. Further, in case the object line image data is black line image data (the case of YES in S114), NK2 starts the counting of the number of lines of line image data, and in case the object line image data is color line image data (the case of NO in S116), NK2 stops counting the number of lines of line image data. Further, in case the object line image data is blank line image data (the case of YES in S112), NB2 starts the counting of the number of lines of line image data, and in case the object line image data is color or black line image data (the case of NO in S110), NB2 stops counting the number of lines of line image data.

When the count process of S52 ends, in S54 the determination unit 32 judges whether the sum of the values of the three counters NK2, NC2, NB2 is equal to the value of NK1. In case the aforementioned sum is equal to the value of NK1 (the case of YES in S54), the determination unit 32 proceeds to S56, and in case the aforementioned sum is less than the value of NK1 (the case of NO in S54), the determination unit 32 proceeds to S84.

In S56, the judging unit 34 (see FIG. 1) judges whether NC2>0. In case NC2>0 (the case of YES in S56), the determination unit 32 proceeds to S58, and in case NC2=0 (the case of NO in S56), the determination unit 32 proceeds to S72.

In S58, the determination unit 32 selects the partial image data. In S58, the determination unit 32 does not select the color line image data within the unprocessed line image data as the partial image data. That is, in S58, from within the unprocessed line image data, the determination unit 32 selects, as the partial image data, only less than N lines (four lines) of line image data which includes black line image data present at the furthest downstream side and one or more lines of black or blank line image data adjacent to the black line image data (e.g., only the three lines of line image data L-th to L+2 of case G of FIG. 10).

Upon ending S58, the determination unit 32 proceeds to a supplying process of S60. The supplying process of S60 is performed in the same manner as the supplying process of S36, etc. of FIG. 4 (see FIG. 7), with the partial image data selected in S58 as the "selected partial image data". As described above, color line image data is not selected in S58. Consequently, in the supplying process of S60, S142 of FIG. 7 is not performed, and S144 is performed.

Then, in S62, the determination unit 32 selects N lines of line image data present at the furthest downstream side within the unprocessed line image data as the partial image data. As described above, since color line image data is not selected in S58, within the unprocessed line image data, one line of line image data present at the furthest downstream side is color line image data (e.g., see the L+3 line image data of case G of FIG. 10). Consequently, in S62, from within the unprocessed line image data, the determination unit 32 selects, as the partial image data, N lines of line image data which include the color line image data present at the furthest downstream side (e.g., the four lines of line image data L+3 to L+6 of case G of FIG. 10).

Upon ending S62, the determination unit 32 proceeds to the supplying process of S64. The supplying process of S64 is performed in the same manner as the supplying process of S36, etc. of FIG. 4 (see FIG. 7), with the partial image data selected in S62 as the "selected partial image data". As described above, color line image data is selected in S62. Consequently, in the supplying process of S64, S144 of FIG. 7 is not performed, and S142 is performed.

Then, in S66 the determination unit 32 judges whether the number L that indicates the object line image data is equal to LT. In case L-LT (in case of NO in S66), in S70 the determination unit 32 adds "1" to the number L that indicates the object line image data, determines new object line image data, and returns to S16 of FIG. 4. On the other hand, in case L-LT (in case of YES in S66), the printer driver process ends.

On the other hand, in S72 the determination unit 32 selects, as the partial image data, N lines of line image data present at the furthest downstream side (e.g., the L-th to L+3 line image data of case I of FIG. 10) within the unprocessed line image data. Since NC1>1 at the stage when S72 is performed (YES in S22 and NO in S26 of FIG. 4) the "N lines of line image data present at the furthest downstream side" include color line image data (e.g., the L+3 line image data of case I of FIG. 10).

Upon ending S72, the determination unit 32 proceeds to a supplying process of S74. The supplying process of S74 is performed in the same manner as the supplying process of S36, etc. of FIG. 4 (see FIG. 7), with the partial image data selected in S72 as the "selected partial image data". As described above, color line image data is selected in S72. Consequently, in the supplying process of S74, S144 of FIG. 7 is not performed, and S142 is performed.

Then, in S76, the count unit 38 substitutes the value of the counter NK2 for the value of the counter NK1, the value of the counter NC2 for the value of the counter NC1, and the value of the counter NB2 for the value of the counter NB1. In S76, further, the count unit 38 sets the value of the counters NK1, NC1, NB1 to "0".

Then, in S78, the determination unit 32 judges whether the number L that indicates the object line image data is equal to LT. In case L=LT (the case of YES in S78) the determination unit 32 proceeds to S80, and in case L<LT (the case of NO in S78), the determination unit 32 returns to S24 of FIG. 4.

In S80, as in S30 of FIG. 4, the determination unit 32 selects all the unprocessed line image data as the partial image data. Then, in S82, the supplying process (see FIG. 7) is performed with the partial image data selected in S80 as the "selected partial image data". When the supplying process of S82 ends, the printer driver process ends.

On the other hand, in S84, the determination unit 32 judges whether the number L that indicates the object line image data is equal to LT. In case L=LT (in case of YES in S84), the determination unit 32 proceeds to S86, and in case L<LT (in case of NO in S84), the determination unit 32 proceeds to S50.

In S86, the determination unit 32 judges whether NK2=0 and NC2=0. In case at least one of NK2 and NC2 is equal to or more than "1" (in case of NO in S86), the determination unit 32 proceeds to S88, and in case NK2=0 and NC2=0 (in case of YES in S86), the determination unit 32 proceeds to S92.

In S88, as in S58, the determination unit 32 selects only less than N lines (four lines) of black or blank line image data as the partial image data. Then, in S90, the supplying process (see FIG. 7) is performed with the partial image data selected in S88 as the "selected partial image data". Upon ending the supplying process of S90, the determination unit 32 proceeds to S92.

In S92, as in S30 of FIG. 4, the determination unit 32 selects all the unprocessed line image data as the partial image data. Then, in S94, the supplying process (see FIG. 7) is performed with the partial image data selected in S92 as the "selected partial image data". When the supplying process of S94 ends, the printer driver process ends.

(Various Cases Realized by the Processes S50 to S94 of FIG. 5; FIG. 10, FIG. 11)

Next, various cases realized by the processes S50 to S94 of FIG. 5 will be described.

(Case G of FIG. 10)

In case G, L-th to L+2 line image data is black line image data, and L+3 to L+6 line image data is color line image data. In this case, when the count process of the L+3 color line image data (S18 of FIG. 4) ends, the processes from S50 of FIG. 5 onward are performed.

The count unit 38 sequentially performs the count process of the L+4 to L+6 color line image data (S52 of FIG. 5), and sequentially increments NC2 to "1", "2", "3" (S118 of FIG. 6). Thereby, the determination unit 32 judges YES in S54 of FIG. 5, the judging unit 34 judges YES in S56, and the process proceeds to S58.

In S58, the determination unit 32 selects only the L-th to L+2 black line image data as the partial image data. Further, in the supplying process of S60 of FIG. 5, the determination unit 32 determines that the main scanning direction of the present time is the opposite direction to the main scanning direction of the previous time (S144 of FIG. 7). Moreover, in S148 of FIG. 7, the print data creation unit 30 creates data indicating a transporting distance corresponding to three nozzle pitches (i.e., the number of lines (Y=3) of line image data included in the selected partial image data), this being less than four nozzle pitches.

Further, in S62 of FIG. 5, the determination unit 32 selects the L+3 to L+6 line image data as the partial image data. Further, in the supplying process of S64, the determination unit 32 determines that the main scanning direction of the present time is the outgoing path OP (S142 of FIG. 7). Further, in S148 of FIG. 7, the print data creation unit 30 creates data indicating a transporting distance corresponding to four nozzle pitches.

(Case H of FIG. 10)

Case H is the same as case G, except for the points that the L+1 line image data is blank line image data, and the L+5 line image data is black or blank line image data. In case H, as in case G, since the counters NK1, etc. are incremented, the partial image data is selected, as in case G. This point is the same in the case where the L+2 line image data is blank line image data and the case where the L+4 and/or L+6 line image data is black or blank line image data.

(Case I of FIG. 10)

Case I is the same as case G, except for the point that the L+4 to L+6 line image data is black line image data. In case I, when the count process of the L+3 color line image data (S18 of FIG. 4) ends, the processes from S50 of FIG. 5 onward are performed.

In case G, the count unit 38 increments NC2 when the count process (S52 of FIG. 5) of the L+4 to L+6 color line image data is performed. However, in case I, the count unit 38 sequentially performs the count process of the L+4 to L+6 black line image data (S52 of FIG. 5), and sequentially increments NK2 to "1", "2", "3" (S120 of FIG. 6). Thereby, the determination unit 32 judges YES in S54 of FIG. 5, the judging unit 34 judges NO in S56, and the process proceeds to S72.

In S72, the determination unit 32 selects the L-th to L+3 line image data as the partial image data. Further, in the supplying process of S74, the determination unit 32 determines that the main scanning direction of the present time is the outgoing path OP (S142 of FIG. 7). Then, the count unit 38 performs a process S76 of FIG. 5, and changes the value of the counters NK1, etc.

(Case K of FIG. 11)

In case K, LT–2 line image data is color line image data, and the remaining line image data is black line image data. When the count process (S52 of FIG. 5) of the LT-th line image data ends, the determination unit 32 judges NO in S54 of FIG. 5, judges YES in S84, judges NO in S86 and proceeds to S88.

In S88, the determination unit 32 selects only LT–5 to LT–3 black line image data as the partial image data. Further, in the supplying process of S90, the determination unit 32 determines that the main scanning direction of the present time is the opposite direction to the main scanning direction of the previous time (S144 of FIG. 7). Further, in S92 of FIG. 5, the determination unit 32 selects LT–2 to LT-th line image data as the partial image data. Further, in the supplying process of S94, the determination unit 32 determines that the main scanning direction of the present time is the outgoing path OP (S142 of FIG. 7).

(Case L of FIG. 11)

Case L is the same as case J, except for the point that the LT–1 to LT-th line image data is blank line image data. In this case, when the count process (S52 of FIG. 5) of the LT-th line image data ends, since YES is judged in S86 of FIG. 5, the determination unit 32 proceeds to S92 without performing S88 and S90.

In S92, the determination unit 32 selects LT–5 to LT–2 line image data as the partial image data. Further, in the supplying process of S94, the determination unit 32 determines that the main scanning direction of the present time is the outgoing path OP (S142 of FIG. 7).

(Result of Present Embodiment)

As described above, in the present embodiment, the determination unit 32 sequentially selects a plurality of partial image data from among the CMYK image data ID in the order from the downstream side to the upstream side in the sub scanning direction (S30, S34 of FIG. 4, S58, S62, S72, S80, S88, S92 of FIG. 5), and determines the direction of main scanning for printing each partial image represented by the partial image data. In particular, the determination unit 32 selects the partial image data as in (1) to (7) below.

(1) As shown in case A of FIG. 8, in the case where each of N lines of line image data (the L-th to L+3 line image data) is black line image data which represents a line image to be printed only by the K ink, the determination unit 32 selects the N lines of line image data as the partial image data (S34 of FIG. 4), and determines that the direction of main scanning for printing the partial image is the opposite direction to the main scanning direction of the previous time (S36 of FIG. 4).

(2) As shown in case D of FIG. 9, in the case where each of N lines of line image data (the L-th to L+3 line image data) is color line image data which represents a line image to be printed by two or more colors of ink from within CMYK, the determination unit 32 selects the N lines of line image data as the partial image data (S34 of FIG. 4), and determines that the direction of main scanning for printing the partial image is the outgoing path OP (S36 of FIG. 4).

(3) In cases G, H of FIG. 10, three lines of target line image data (the L-th to L+2 line image data), which are aligned continuously toward the upstream side from the Lth line image data that constitutes the downstream side edge within the N lines of line image data (the L-th to L+3 line image data), represent three lines of line image to be printed only by K, and the remaining line image data (the L+3 line image data) within the N lines of line image data, excluding the L-th to L+2 line image data, includes color line image data. In this case, without selecting the N lines of line image data, the determination unit 32 selects only the L-th to L+2 black or blank line image data as the partial image data (S58 of FIG. 5), and determines that the direction of main scanning for printing the partial image is the opposite direction to the main scanning direction of the previous time (S60 of FIG. 5). Further, the determination unit 32 selects, as the partial image data, N lines of line image data which include the remaining line image data (the L+3 line image data) and three lines of additional line image data (L+4 to L+6 line image data) which are adjacent to the remaining line image data and are aligned continuously toward the upstream side (S62 of FIG. 5), and determines that the direction of main scanning for printing the partial image is the outgoing path OP (S64 of FIG. 5).

(4) In case F of FIG. 9, two lines of line image data (the L-th to L+1 line image data), which are aligned continuously toward the upstream side from the Lth line image data that constitutes the downstream side edge within the N lines of line image data (the L-th to L+3 line image data), represent two lines of line image to be printed by two or more colors of ink from within CMYK, and the remaining line image data (the L+2 to L+3 line image data) within the N lines of line image data, excluding the L-th to L+1 line image data, includes black line image data. In this case, the determination unit 32 selects the N lines of line image data (S34 of FIG. 4), and determines that the direction of main scanning for printing the partial image is the outgoing path OP (S36 of FIG. 4).

In the present embodiment, since the PC 10 performs the processes (1) to (4) (in particular, the process (3)), the printing shown in case (A2) of FIG. 2 can be realized. Consequently, the number of times of the color path can be reduced, and the number of color image boundaries can be reduced. Consequently, a high-quality printed image can be presented to the user. In particular, in the present embodiment, the number of nozzles (i.e., N) included in one nozzle line is "4", but if the number of N increases, the effect of reducing the number of color image boundaries becomes significant. However, the number of N may be three or less. Generally speaking, N may be any integer equal to or more than 2.

(5) Further, in cases G, H, I of FIG. 10, the judging unit 34 judges whether the additional line image data (the L+4 to L+6 line image data) includes color line image data (S56 of FIG. 5). In case the additional line image data includes color line image data (YES in S56 of FIG. 5), the determination unit 32 selects only the L-th to L+2 black or blank line image data as the partial image data, as shown in cases G, H (S58 of FIG. 5). On the other hand, in case the additional line image data does not include color line image data (NO in S56 of FIG. 5), the determination unit 32 selects N lines of line image data (the L-th to L+3 line image data), as shown in case I (S72 of FIG. 5), and determines that the direction of main scanning for printing the partial image is the outgoing path OP (S74 of FIG. 5).

In the present embodiment, since the PC 10 performs the process (5), the partial image data can be selected appropriately in accordance with the results determined as to whether the additional line image data includes color line image data. Consequently, in case I of FIG. 10, the PC 10 can realize the printing shown in FIG. 3 (C2). Consequently, the total number of paths for printing the image can be reduced, and printing can be performed rapidly.

(6) Further, in case J of FIG. 11, N lines of line image data (the LT−3 to LT-th line image data) include line image data (the LT-th line image data) constituting an edge on the upstream side within the CMYK image data ID. In this case, the determination unit 32 selects the N lines of line image data as the partial image data (S30 of FIG. 4), and determines that the direction of main scanning for printing the partial image is the outgoing path OP (S32 of FIG. 4).

In the present embodiment, since the PC 10 performs the process (6), the PC 10 can realize the printing shown in FIG. 3 (E2). Consequently, the total number of paths for printing the image can be reduced, and printing can be performed rapidly.

(7) Further, as shown in case C of FIG. 8, the determination unit 32 selects the partial image data such that the line image data constituting an edge on the downstream side within the partial image data is not blank line image data (the L-th to L+1 line image data). In other words, the determination unit 32 selects N lines of line image data (the L+2 to L+5 line image data) such that the line image data constituting an edge on the downstream side within the N lines of line image data does not include blank line image data, and selects the partial image data from within the N lines of line image data.

In the present embodiment, since the PC 10 performs the process (7), the PC 10 can realize the printing shown in FIG. 3 (D2). Consequently, the total number of paths for printing the image can be reduced, and printing can be performed rapidly.

Moreover, in the present embodiment, the PC 10 performs the processes (1) to (7). However, in a variant, any of the processes (4) to (7), this not including the processes (1) to (3), may not be performed by the PC 10. For example, in case the PC 10 does not perform the process (5), the printing shown in the comparative example of FIG. 3 (C1) is performed. Further, e.g., in case the PC 10 does not perform the process (6), the printing shown in the comparative example of FIG. 3 (E1) is performed. Further, e.g., in case the PC 10 does not perform the process (7), the printing shown in the comparative example of FIG. 3 (D1) is performed. That is, the printing of FIG. 3 (C1), (C2), (C3) is included in the technical range of the present invention.

(Corresponding Relationships)

The PC 10 and the printer 50 are respectively examples of the "controlling device" and the "print performing unit". The CMYK image data ID is an example of the "image data". The outgoing path OP and the returning path RP are respectively examples of the "first direction" and the "second direction". Further, the outgoing path OP is an example of the "particular direction". The direction corresponding to the sub scanning direction, the side corresponding to the downstream side of the sub scanning direction, and the side corresponding to the upstream side of the sub scanning direction are respectively examples of the "predetermined direction", the "first side" and the "second side". Further, the counter NC1 and the counter NK1 are respectively examples of the "first counter" and the "second counter".

Further, the black line image data and the blank line image data are respectively examples of the "first type of line image data" and the "third type of line image data". Further, within the color line image data (i.e., the line image data which represents a line image to be printed by at least one color of ink from among CMY), the line image data which represents a line image to be printed by two or more colors of ink from within CMYK is an example of the "second type of line image data".

Further, case A of FIG. 8, case D of FIG. 9, case G (or H) of FIG. 10, and case F of FIG. 9 are respectively examples of the "first case", the "second case", the "third case" and the "fourth case". In any of cases A, D, G, F, the L-th to the L+3 line image data is an example of the "first group of N lines of line image data". Further, in case G (or H) of FIG. 10, the L+3 to L+6 line image data is an example of the "second group of N lines of line image data".

(Second Embodiment)

Points differing from the first embodiment will be described. In the present embodiment, the supplying process (S32, etc. of FIG. 4) performed in the printer driver process of FIG. 4 and FIG. 5 is not the supplying process of FIG. 7, but is a supplying process of FIG. 12. In the supplying process of FIG. 12, the concepts "partial image data of the present time" and "partial image data of the previous time" are used. The "partial image data of the present time" is partial image data selected immediately prior to the supplying process of FIG. 12. For example, in case the supplying process of S32 of FIG. 4 is performed, the "partial image data of the present time" is the partial image data selected in S30 immediately prior to the supplying process of S32. The "partial image data of the previous time" is partial image data that was selected the time before the "partial image data of the present time " (i.e., was the "partial image data of the present time" of the supplying process of the previous time).

Figure 12:
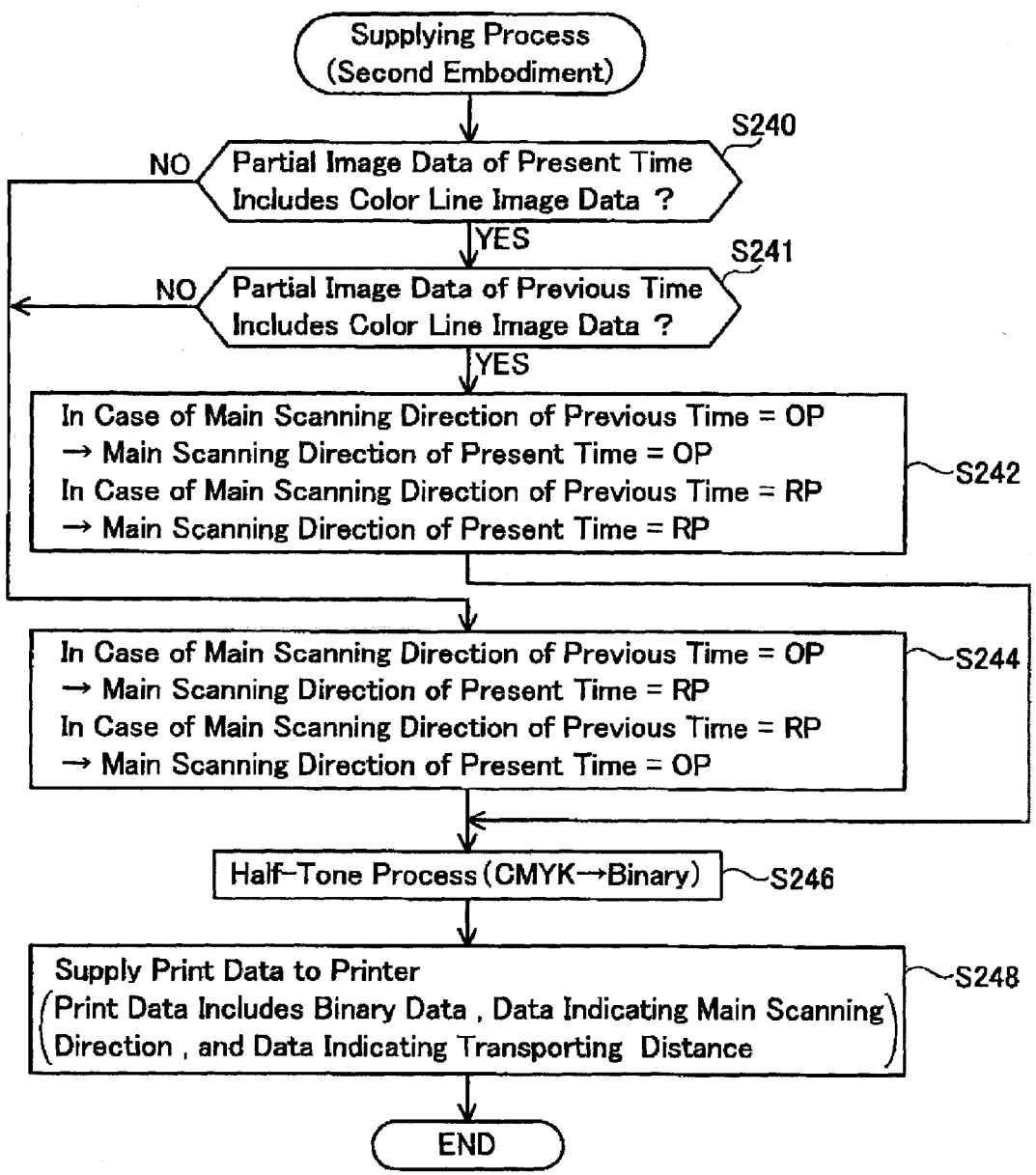
FIG. 12 shows a flowchart of a supplying process of a second embodiment.

In S240 of FIG. 12, the determination unit 32 judges whether the partial image data of the present time includes color line image data. In case the partial image data of the present time includes color line image data (in case of YES in S240), the determination unit 32 proceeds to S241, and in case the partial image data of the present time does not include color line image data (in case of NO in S240), the determination unit 32 proceeds to S244.

In S241, the determination unit 32 judges whether the partial image data of the previous time includes color line image data. In case the partial image data of the previous time includes color line image data (in case of YES in S241), the determination unit 32 proceeds to S242, and in case the partial image data of the previous time does not include color line image data (in case of NO in S241), the determination unit 32 proceeds to S244.

In S242, the determination unit 32 determines that the main scanning direction of the present time is the same direction as the main scanning direction of the previous time (i.e., the main scanning direction determined in the supplying process of the previous time). That is, in case the main scanning direction of the previous time was determined to be the outgoing path OP, the determination unit 32 determines that the main scanning direction of the present time is the outgoing path OP, and in case the main scanning direction of the previous time was determined to be the returning path RP, the determination unit 32 determines that the main scanning direction of the present time is the returning path RP. Moreover, S244 to S248 is the same as S144 to S148 of FIG. 7.

As described above, in the present embodiment, the direction of the color path is not fixed as the outgoing path OP. In case the main scanning of the previous time is the color path, the PC 10 determines that the direction of the color path, which is the main scanning of the present time, is the same direction as the main scanning direction of the previous time (S242 of FIG. 12), and in case the main scanning of the previous time is the black path, the PC 10 determines that the direction of the color path, which is the main scanning of the present time, is the opposite direction to the main scanning direction of the previous time (S244 of FIG. 12).

For example, the comparative example of FIG. 2 (B1) shows how an image 12 is printed using the same method as the comparative example of FIG. 2 (A1). In this case, the number of times of the color path is four, the total number of paths is seven, and the number of color image boundaries is two. By contrast, the second embodiment of FIG. 2 (B2) shows how the image 12 is printed using the method of the present embodiment. In this case, since the first time of main scanning is the black path (1), the direction of the color path, which is the second time of main scanning, is determined to be the returning path RP, this being the opposite direction to the main scanning direction of the previous time (2). Further, since the second time of main scanning is the color path (2), the direction of the color path, which is the third time of main scanning, is determined to be the returning path RP, this being the same direction as the main scanning direction of the previous time (4). Further, since the fourth time of main scanning is the black path (5), the direction of the color path, which is the fifth time of main scanning, is determined to be the returning path RP, this being the opposite direction to the main scanning direction of the previous time (6).

In the present embodiment of FIG. 2 (B2), the number of times of the color path is three, the total number of paths is six, and the number of color image boundaries is one. In the present embodiment, also, the number of times of the color path can be reduced, and consequently the number of color image boundaries can be reduced. Consequently, a high-quality printed image can be presented to the user. Moreover, the total number of paths can also be reduced, and printing can be performed rapidly.

Moreover, in the present embodiment, in printing one sheet of paper, both the color path of the outgoing path OP and the color path of the returning path RP can be performed. In this case, the color appearance of e.g. green within a first color image formed by the color path of the outgoing path OP may differ from e.g. green within a second color image formed by the color path of the returning path RP. However, in the present embodiment, since the direction of two consecutive color paths is determined as the same direction, the first and second color images are not adjacent. Consequently, since it is difficult for the user to perceive a difference, it is possible to suppress the phenomenon in which the user perceives the printed image as a low-quality image.

(Variant 1)

In the foregoing embodiments, the PC 10 comprises the units 30 to 40. However, instead, the controlling unit 60 in the printer 50 may comprise the units 30 to 40. In this case, the controlling unit 60 in the printer 50 is an example of the "controlling device", and the supplying unit 40 in the printer 50 may supply the print data to a print performing unit in the printer 50 (i.e., a print performing unit that performs a print process for controlling the head actuating unit 54 and the medium transporting unit 56).

(Variant 2)

In the foregoing embodiments, the determination unit 32 analyzes the line image data in the CMYK image data ID, and selects the partial image data. Instead, the determination unit 32 may perform the half-tone process on the CMYK image data ID, create data after the half-tone process (e.g., data expressed by binary dot ON or dot OFF), analyze the line image data in the data after the half-tone process, and select the partial image data. In the present variant, the data after the half-tone process is an example of the "image data".

(Variant 3)

In the foregoing embodiments, the determination unit 32 analyzes the line image data in the CMYK image data ID from the downstream side toward the upstream side of the sub scanning direction, and selects the partial image data. Instead, the determination unit 32 may analyze the line image data in the CMYK image data ID from the upstream side toward a side corresponding to the downstream side of the sub scanning direction, and select the partial image data. In the present variant, the upstream side of the sub scanning direction and the downstream side of the sub scanning direction are respectively examples of the "first side" and the "second side".

(Variant 4)

In the foregoing first embodiment, the determination unit 32 fixes the direction of the color path as the outgoing path OP. However, instead, any of the methods below may be adopted.

The determination unit 32 may fix the direction of the color path as the returning path RP. In the present variant, the returning path RP is an example of the "particular direction".

Further, in one time of printing performed according to one command from the user, the determination unit 32 may determine that the direction of a first color path is the opposite direction to the main scanning direction of the previous time, and that the direction of a second and subsequent color paths is the same direction as the direction of the first color path. In the present variant, for the first color path of the one time of printing, the opposite direction to the main scanning direction of the previous time is an example of the "particular direction" and, for the second and subsequent color paths, the same direction as the direction of the first color path is an example of the "particular direction".

Further, in printing one sheet of paper, the determination unit 32 may determine that the direction of a first color path is the opposite direction to the main scanning direction of the previous time, and that the direction of a second and subsequent color paths is the same direction as the direction of the first color path. That is, in the present variant, e.g., the direction of a color path for printing a first page of paper and the direction of a color path for printing a second page of paper may differ. In the present variant, for the first color path printing the first sheet of paper, the opposite direction to the main scanning direction of the previous time is an example of the "particular direction" and, for the second and subsequent color paths, the same direction as the direction of the first color path is an example of the "particular direction".

(Variant 5)

In the foregoing embodiments, the units 30 to 40 are realized by software (the printer driver 26). Instead, at least one of the units 30 to 40 may be realized by a hardware resource such as a logic circuit.

The invention claimed is:

1. A controlling device configured to cause a print performing unit to perform a print, the print performing unit comprising a print head including a plurality of nozzle lines for discharging a plurality of colors of ink, each of the plurality of nozzle lines including N nozzles (N being an integer equal to or more than 2) for discharging corresponding color of ink, the print performing unit being configured to perform a main scanning, the main scanning including causing the print head to move in a first direction or a second direction while the plurality of nozzle lines discharge ink toward a print medium, the controlling device comprising:

one or more processors configured to function as:

a print data creation unit configured to create, by using image data, print data for causing the print performing unit to perform a print of an image represented by the image data, the image data including a plurality of lines of line image data being continuously aligned along a predetermined direction; and a supplying unit configured to supply the print data to the print performing unit, wherein the print data creation unit comprises:

a determination unit configured to sequentially select each of a plurality of partial image data from among the image data in an order from a first side toward a second side of the predetermined direction, so as to determine a direction of the main scanning for printing each partial image represented by the each partial image data, the each partial image data including N or less lines of line image data being continuously aligned along the predetermined direction, wherein the print data creation unit is configured to create the print data such that the print performing unit performs the main scanning in accordance with the direction determined by the determination unit, when the determination unit is to select first target partial image data which is one partial image data of a selection target at a present time:

(A) in a first case where each line image data of a first group of N lines of line image data which are continuously aligned is a first type of line image data representing a line image to be printed by only one specific color of ink among the plurality of colors of ink, the determination unit is configured to select the first group of N lines of line image data as the first target partial image data, so as to determine an opposite direction of a direction of the main scanning of a previous time as a direction of the main scanning for printing a first target partial image represented by the first target partial image data;

(B) in a second case where each line image data of the first group of N lines of line image data is a second type of line image data representing a line image to be printed by two or more colors of ink among the plurality of colors of ink, the determination unit is configured to select the first group of N lines of line image data as the first target partial image data, so as to determine a particular direction as the direction of the main scanning for printing the first target partial image; and (C) in a third case where N1 lines (N1 being an integer less than N) of target line image data represent N1 lines of target line images to be printed by only the one specific color of ink, and (N–N1) lines of remaining line image data include the second type of line image data, the N1 lines of target line image data being continuously aligned from line image data constituting an edge on the first side within the first group of N lines of line image data toward the second side, and the (N–N1) lines of remaining line image data being line image data excluding the N1 lines of target line image data among the first group of N lines of line image data, the determination unit is configured to select only the N1 lines of target line image data as the first target partial image data, so as to determine the opposite direction of the direction of the main scanning of the previous time as the direction of the main scanning for printing the first target partial image, and the determination unit is configured to select a second group of N lines of line image data as second target partial image data, so as to determine the particular direction as a direction of the main scanning for printing a second target partial image represented by the second target partial image data, the second group of N lines of line image data including the (N–N1) lines of remaining line image data and N1 lines of additional line image data, the N1 lines of additional line image data being adjacent to the (N–N1) lines of remaining line image data, the N1 lines of additional line image data being continuously aligned toward the second side.

2. The controlling device as in claim 1, wherein the determination unit comprises:

a judging unit configured to judge in the third case whether the N1 lines of additional line image data include the second type of line image data, and wherein in the third case, if it is judged that the N1 lines of additional line image data include the second type of line image data, the determination unit is configured to select only the N1 lines of target line image data as the first target partial image data.

3. The controlling device as in claim 2, wherein in the third case, if it is judged that the N1 lines of additional line image data do not include the second type of line image data, the determination unit is configured to select the first group of N lines of line image data as the first target partial image data, so as to determine the particular direction as the direction of the main scanning for printing the first target partial image.

4. The controlling device as in claim 1, wherein in the third case, if the first group of N lines of line image data includes line image data constituting an edge of the second side within the image data, the determination unit is configured to select the first group of N lines of line image data as the first target partial image data, so as to determine the particular direction as the direction of the main scanning for printing the first target partial image.

5. The controlling device as in claim 1, wherein
when the determination unit is to select the first target partial image data,
(D) in a fourth case where N2 lines (N2 being an integer less than N) of target line image data represent N2 lines of target line images to be printed by two or more colors of ink among the plurality of colors of ink, and (N−N2) lines of remaining line image data include the first type of line image data, the N2 lines of target line image data being continuously aligned from the line image data constituting the edge of the first side within the first group of N lines of line image data toward the second side, the (N−N2) lines of remaining line image data being line image data excluding the N2 lines of target line image data among the first group of N lines of line image data,
the determination unit is configured to select the first group of N lines of line image data as the first target partial image data, so as to determine the particular direction as the direction of the main scanning for printing the first target partial image.

6. The controlling device as in claim 1, wherein
the determination unit is configured to select the first group of N lines of line image data such that the line image data constituting the edge of the first side within the first group of N lines of line image data does not include a third type of line image data which represents a line image not to be printed by any color of ink among the plurality of colors of ink.

7. The controlling device as in claim 1, wherein
the particular direction is the first direction.

8. The controlling device as in claim 1, wherein
when the determination unit is to select one partial image data so as to determine the particular direction as a direction of the main scanning for printing one partial image represented by the one partial image data;
in a case where the main scanning of a previous time is performed by discharging two or more colors of ink among the plurality of colors of ink, the determination unit determines the same direction as a direction of the main scanning of the previous time as the particular direction; and
in a case where the main scanning of the previous time is performed by discharging only the one specific color of ink, the determination unit determines the opposite direction of the direction of the main scanning of the previous time as the particular direction.

9. The controlling device as in claim 1, wherein
the determination unit comprises:
an analysis unit configured to analyze, in the order from the first side toward the second side, a type of each line image data from among a plurality of types of line image data including the first type of line image data and the second type of line image data; and
a count unit configured to count a number of line image data in accordance with a result of the analysis,
the count unit includes:
a first counter configured to start counting a number of line image data in a case where the result of the analysis for object line image data indicates the second type of line image data; and
a second counter configured to start counting a number of line image data in a case where the counted value of the first counter is zero and the result of the analysis for the object line image data indicates the first type of line image data, the second counter further configured to end counting the number of line image data in a case where the result of the analysis for the object line image data indicates the second type of line image data, and
the determination unit is configured to perform the selection of the first target partial image data and the determination of the direction of the main scanning for printing the first target partial image based on the counted value of the first counter and the counted value of the second counter in a case where a sum of the counted value of the first counter and the counted value of the second counter is equal to N.

10. The controlling device as in claim 1, wherein
the one specific color includes black color.

11. A controlling device configured to cause a print performing unit to perform a print, the print performing unit comprising a print head including a plurality of nozzle lines for discharging a plurality of colors of ink, each of the plurality of nozzle lines including N nozzles (N being an integer equal to or more than 2) for discharging corresponding color of ink, the print performing unit being configured to perform a main scanning, the main scanning including causing the print head to move in a first direction or a second direction while the plurality of nozzle lines discharge ink toward a print medium, the controlling device comprising:
a print data creation unit configured to create, by using image data, print data for causing the print performing unit to perform a print of an image represented by the image data, the image data including a plurality of lines of line image data being continuously aligned along a predetermined direction; and
a supplying unit configured to supply the print data to the print performing unit,
wherein the print data creation unit comprises:
a determination unit configured to sequentially select each of a plurality of partial image data from among the image data in an order from a first side toward a second side of the predetermined direction, so as to determine a direction of the main scanning for printing each partial image represented by the each partial image data, the each partial image data including N or less lines of line image data being continuously aligned along the predetermined direction,
wherein the print data creation unit is configured to create the print data such that the print performing unit performs the main scanning in accordance with the direction determined by the determination unit,
when the determination unit is to select first target partial image data which is one partial image data of a selection target at a present time:
(A) in a first case where each line image data of a first group of N lines of line image data which are continuously aligned is a first type of line image data representing a line image to be printed by only one specific color of ink among the plurality of colors of ink, the determination unit is configured to select the first group of N lines of line image data as the first target partial image data, so as to determine an opposite direction of a direction of the main scanning of a previous time as a direction of the main scanning for printing a first target partial image represented by the first target partial image data;
(B) in a second case where each line image data of the first group of N lines of line image data is a second type of line image data representing a line image to be printed by two or more colors of ink among the plurality of colors of ink, the determination unit is configured to select the first group of N lines of line image data as the first target partial image data, so as to determine a particular direction as the direction of the main scanning for printing the first target partial image; and (C) in a third case where N1 lines (N1 being an integer less than N) of target line image data represent N1 lines of target line images to be printed by only the one specific color of ink, and (N−N1) lines of remaining line image data include the second type of line image data, the N1 lines of target line image data being continuously aligned from line image data constituting an edge on the first side within the first group of N lines of line image data toward the second side, and the (N−N1) lines of remaining line image data being line image data excluding the N1 lines of target line image data among the first group of N lines of line image data, the determination unit is configured to select only the N1 lines of target line image data as the first target partial image data, so as to determine the opposite direction of the direction of the main scanning of the previous time as the direction of the main scanning for printing the first target partial image, and the determination unit is configured to select a second group of N lines of line image data as second target partial image data, so as to determine the particular direction as a direction of the main scanning for printing a second target partial image represented by the second target partial image data, the second group of N lines of line image data including the (N−N1) lines of remaining line image data and N1 lines of additional line image data, the N1 lines of additional line image data being adjacent to the (N−N1) lines of remaining line image data, the N1 lines of additional line image data being continuously aligned toward the second side.

12. A non-transitory computer readable storage medium that stores a computer program for a controlling device configured to cause a print performing unit to perform a print, the print performing unit comprising a print head including a plurality of nozzle lines for discharging a plurality of colors of ink, each of the plurality of nozzle lines including N nozzles (N being an integer equal to or more than 2) for discharging corresponding color of ink, the print performing unit being configured to perform a main scanning, the main scanning including causing the print head to move in a first direction or a second direction while the plurality of nozzle lines discharge ink toward a print medium, the computer program including instructions for causing one or more processors of the controlling device to perform:

creating, by using image data, print data for causing the print performing unit to perform a print of an image represented by the image data, the image data including a plurality of lines of line image data being continuously aligned along a predetermined direction; and supplying the print data to the print performing unit, wherein the creating the print data includes:

sequentially selecting each of a plurality of partial image data from among the image data in an order from a first side toward a second side of the predetermined direction; and determining a direction of the main scanning for printing each partial image represented by the each partial image data, the each partial image data including N or less lines of line image data being continuously aligned along the predetermined direction, wherein the creating the print data is performed such that the print performing unit performs the main scanning in accordance with the determined direction, when first target partial image data which is one partial image data of a selection target at a present time is to be selected:

(A) in a first case where each line image data of a first group of N lines of line image data which are continuously aligned is a first type of line image data representing a line image to be printed by only one specific color of ink among the plurality of colors of ink, the first group of N lines of line image data is selected as the first target partial image data, and an opposite direction of a direction of the main scanning of a previous time is determined as a direction of the main scanning for printing a first target partial image represented by the first target partial image data;

(B) in a second case where each line image data of the first group of N lines of line image data is a second type of line image data representing a line image to be printed by two or more colors of ink among the plurality of colors of ink, the first group of N lines of line image data is selected as the first target partial image data, and a particular direction is determined as the direction of the main scanning for printing the first target partial image; and (C) in a third case where N1 lines (N1 being an integer less than N) of target line image data represent N1 lines of target line images to be printed by only the one specific color of ink, and (N−N1) lines of remaining line image data include the second type of line image data, the N1 lines of target line image data being continuously aligned from line image data constituting an edge on the first side within the first group of N lines of line image data toward the second side, and the (N−N1) lines of remaining line image data being line image data excluding the N1 lines of target line image data among the first group of N lines of line image data, only the N1 lines of target line image data is selected as the first target partial image data, and the opposite direction of the direction of the main scanning of the previous time is determined as the direction of the main scanning for printing the first target partial image, and a second group of N lines of line image data is selected as second target partial image data, and the particular direction is determined as a direction of the main scanning for printing a second target partial image represented by the second target partial image data, the second group of N lines of line image data including the (N−N1) lines of remaining line image data and N1 lines of additional line image data, the N1 lines of additional line image data being adjacent to the (N−N1) lines of remaining line image data, the N1 lines of additional line image data being continuously aligned toward the second side.

* * * * *